US008296206B1

(12) United States Patent
Del Favero et al.

(10) Patent No.: US 8,296,206 B1
(45) Date of Patent: Oct. 23, 2012

(54) METHOD AND SYSTEM FOR PROVIDING INTELLIGENT TARGETED BUDGETING USING FINANCIAL TRANSACTION DATA FROM SIMILARLY SITUATED INDIVIDUALS

(75) Inventors: James Robert Del Favero, Mountain View, CA (US); Marko Rukonic, San Jose, CA (US); Yuri Kapulkin, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 302 days.

(21) Appl. No.: 12/771,023

(22) Filed: Apr. 30, 2010

(51) Int. Cl.
*G06Q 40/00* (2006.01)
(52) U.S. Cl. ............................................. 705/35; 705/1.1
(58) Field of Classification Search .................. 705/1.1, 705/35
See application file for complete search history.

(56) References Cited

U.S. PATENT DOCUMENTS

| 7,729,964 | B2 | 6/2010 | Senturk et al. |
| 7,788,147 | B2 * | 8/2010 | Haggerty et al. .............. 705/35 |
| 2002/0010612 | A1 * | 1/2002 | Smith et al. .................. 705/8 |
| 2002/0173986 | A1 * | 11/2002 | Lehew et al. .................. 705/1 |
| 2003/0120572 | A1 * | 6/2003 | Coventry et al. .............. 705/35 |
| 2004/0230612 | A1 | 11/2004 | Mattson et al. |
| 2004/0254835 | A1 * | 12/2004 | Thomas et al. ................ 705/14 |
| 2005/0108268 | A1 | 5/2005 | Saintry et al. |
| 2005/0137953 | A1 * | 6/2005 | McDonough et al. ........ 705/36 |
| 2006/0101323 | A1 * | 5/2006 | Satyavolu ................ 715/501.1 |
| 2006/0242050 | A1 * | 10/2006 | Haggerty et al. .............. 705/35 |
| 2007/0088641 | A1 * | 4/2007 | Aaron et al. .................. 705/35 |
| 2008/0195451 | A1 | 8/2008 | Abram |
| 2008/0221990 | A1 * | 9/2008 | Megdal et al. ................ 705/14 |
| 2009/0037461 | A1 * | 2/2009 | Rukonic et al. ........... 707/103 R |
| 2009/0204531 | A1 * | 8/2009 | Johnson ....................... 705/35 |
| 2009/0276368 | A1 * | 11/2009 | Martin et al. .............. 705/36 R |
| 2009/0281873 | A1 | 11/2009 | Yaskin |
| 2009/0319411 | A1 * | 12/2009 | Debie et al. ................... 705/35 |
| 2010/0063914 | A1 * | 3/2010 | Lozano et al. ................. 705/35 |
| 2010/0161379 | A1 * | 6/2010 | Bene et al. .................... 705/10 |
| 2010/0223160 | A1 * | 9/2010 | Brown ......................... 705/27 |
| 2010/0250419 | A1 * | 9/2010 | Ariff et al. .................... 705/35 |
| 2010/0250420 | A1 * | 9/2010 | Ariff et al. .................... 705/35 |

(Continued)

OTHER PUBLICATIONS

Rao et al., "Method and System for Providing Budgeting Recommendations Based on Data from Similarly Situated Individuals," U.S. Appl. No. 12/756,851, filed Apr. 8, 2010.

*Primary Examiner* — Jagdish Patel
*Assistant Examiner* — Sara C Hamilton
(74) *Attorney, Agent, or Firm* — McKay and Hodgson, LLP; Philip McKay; Sean P. Lewis

(57) ABSTRACT

A method and system for providing intelligent targeted budget analysis and recommendations based on financial data from similarly situated individuals whereby financial data associated with multiple individuals is obtained and analyzed to identify financial profile elements associated with each individual. Data indicating the financial profile elements associated with the each of the individuals is stored in a financial profile database. The financial data associated with a given individual is then also obtained and analyzed to identify financial profile elements associated with the given individual. The financial profile elements associated with the given individual are then used to search the financial profile database to find one or more individuals that are financial peers of the given individual. The financial data associated with the identified one or more financial peers of the given individual is then analyzed, aggregated, averaged, and/or otherwise processed, to provide the given individual one or more budget recommendations.

17 Claims, 3 Drawing Sheets

U.S. PATENT DOCUMENTS

2010/0250421 A1* 9/2010 Ariff et al. ............ 705/35
2010/0250430 A1* 9/2010 Ariff et al. ............ 705/38
2010/0268629 A1* 10/2010 Ross et al. ............ 705/35
2011/0087575 A1* 4/2011 Debie et al. ............ 705/35
2011/0307374 A1* 12/2011 Grundner et al. ............ 705/39

* cited by examiner

METHOD AND SYSTEM FOR PROVIDING INTELLIGENT TARGETED BUDGETING USING FINANCIAL TRANSACTION DATA FROM SIMILARLY SITUATED INDIVIDUALS

BACKGROUND

For most individuals, being aware of, and monitoring, the state of their finances and tracking their overall financial situation or "financial health" should be an extremely important and fundamental responsibility. Unfortunately, due to a lack of time, limits of currently available resources, and in some instances, a lack of motivation, many individuals have historically failed to recognize and accept this responsibility. However, recent economic events have reminded many individuals of the urgent need to know, and monitor, the state of their finances and financial health.

Several computing system implemented and/or on-line implemented financial management systems are currently available to help an individual, or an authorized user on behalf of an individual, gather an individual's own financial data and/or process/analyze that individual's own financial data. Typically, these currently available financial management systems provide an individual/user with financial data such as, but not limited to, the individual's overall financial position data, the individual's income data, the individual's expense data, and the individual's transactional data, all typically directed solely to the individual's own situation and/or activities. However, many individuals fail to take advantage of all the features offered by currently available financial management systems. This is often because of the individuals' unwillingness to devote the time and energy required to initially implement many of the features offered by currently available financial management systems and the often limited value of the resulting data reports/analysis.

One feature that is often under utilized by many actual, and potential, users of currently available financial management systems is the budgeting feature. This is because budgeting features available through currently available financial management systems not only typically require significant data entry and analysis by the user, but the budgets eventually provided are typically created based strictly on the individual's own historical spending, situation, activities, and/or stated goals. Consequently, budgeting features available through currently available financial management systems are often very time consuming and difficult to create, are largely created in isolation based solely on the user's own financial data, and often provide the user little or no guidance on how to start to budget their money and/or how their budgets compare with others.

Some currently available financial management systems provide users very limited and generalized financial statistics and/or recommendations/guidelines. However, using these currently available financial management systems, the user is typically required to provide significant data input and then, for their efforts, the user is often provided only highly generalized statistics and/or recommendations/guidelines that are typically of limited value to the user since they are often based on general spending assumptions and overly broad groupings that do not necessarily apply to the individual's specific financial situation, the individual's specific financial data, or the given individual's peers. Consequently, the currently available generalized "rule of thumb" statistics and/or budget recommendations/guidelines usually fail to provide the user/individual with any truly useful data, or the necessary motivation to modify their spending habits in order to establish more sound financial practices.

As a result of the situation described above, many individuals using currently available financial management systems do not make use of the budgeting features due to a lack of initial budgeting guidelines, the energy required to implement the budgeting features, and the limited value of the data provided by the currently available budgeting features. Consequently, using currently available financial management systems, individuals often fail to obtain the benefits of both a realistic budget and the comparative analysis and the "wisdom of the masses" that has become available with the advent of the Internet, improved processing power, and improved data storage.

SUMMARY

In accordance with one embodiment, a method and system for providing intelligent targeted budget analysis and recommendations based on financial data from similarly situated individuals includes a process for providing intelligent targeted budget analysis and recommendations based on financial data from similarly situated individuals whereby, in one embodiment, financial data associated with multiple individuals is obtained and analyzed to identify financial profile elements associated with each individual. In one embodiment, data indicating the financial profile elements associated with the each of the individuals is correlated to the individuals and stored in a financial profile database. In one embodiment, the financial data associated with a given individual is then also obtained and analyzed to identify financial profile elements associated with the given individual. In one embodiment, the financial profile elements associated with the given individual are then used to search the financial profile database to find one or more other individuals that are financial peers of the given individual, i.e., have financial profile elements and/or financial profile element values similar to the financial profile elements and/or financial profile element values associated with the given individual. In one embodiment, the financial data associated with the identified one or more financial peers of the given individual is then analyzed, aggregated, averaged, and/or otherwise processed, to provide the given individual budget analysis data and/or one or more budget recommendations.

Using the method and system for providing intelligent targeted budget analysis and recommendations based on financial data from similarly situated individuals disclosed herein, an individual's actual financial transaction data is used to identify financial peers of the individual. Then, using the method and system for providing intelligent targeted budget analysis and recommendations based on financial data from similarly situated individuals disclosed herein, the aggregated, averaged, and/or otherwise processed, budget/spending data for the identified financial peers of the given individual is used to provide the individual with an initial budget template and/or guidelines, and/or a comparison between the aggregated, averaged, and/or otherwise processed budget/spending data for the identified one or more financial peers of the given individual and the financial transaction data, and/or budgeting data, associated with given individual.

Consequently, using the method and system for providing intelligent targeted budget analysis and recommendations based on financial data from similarly situated individuals disclosed herein, not only are individuals spared the need to expend time and energy entering large amounts of budgeting data required to initiate currently available budgeting features, but they can immediately benefit from the comparative analysis and the "wisdom of the masses" that has become available with the advent of the Internet, improved processing power, and improved data storage.

As discussed in more detail below, using the below embodiments, with little or no modification and/or user input, there is considerable flexibility, adaptability, and opportunity for customization to meet the specific needs of various users under numerous circumstances.

Figure 1A:
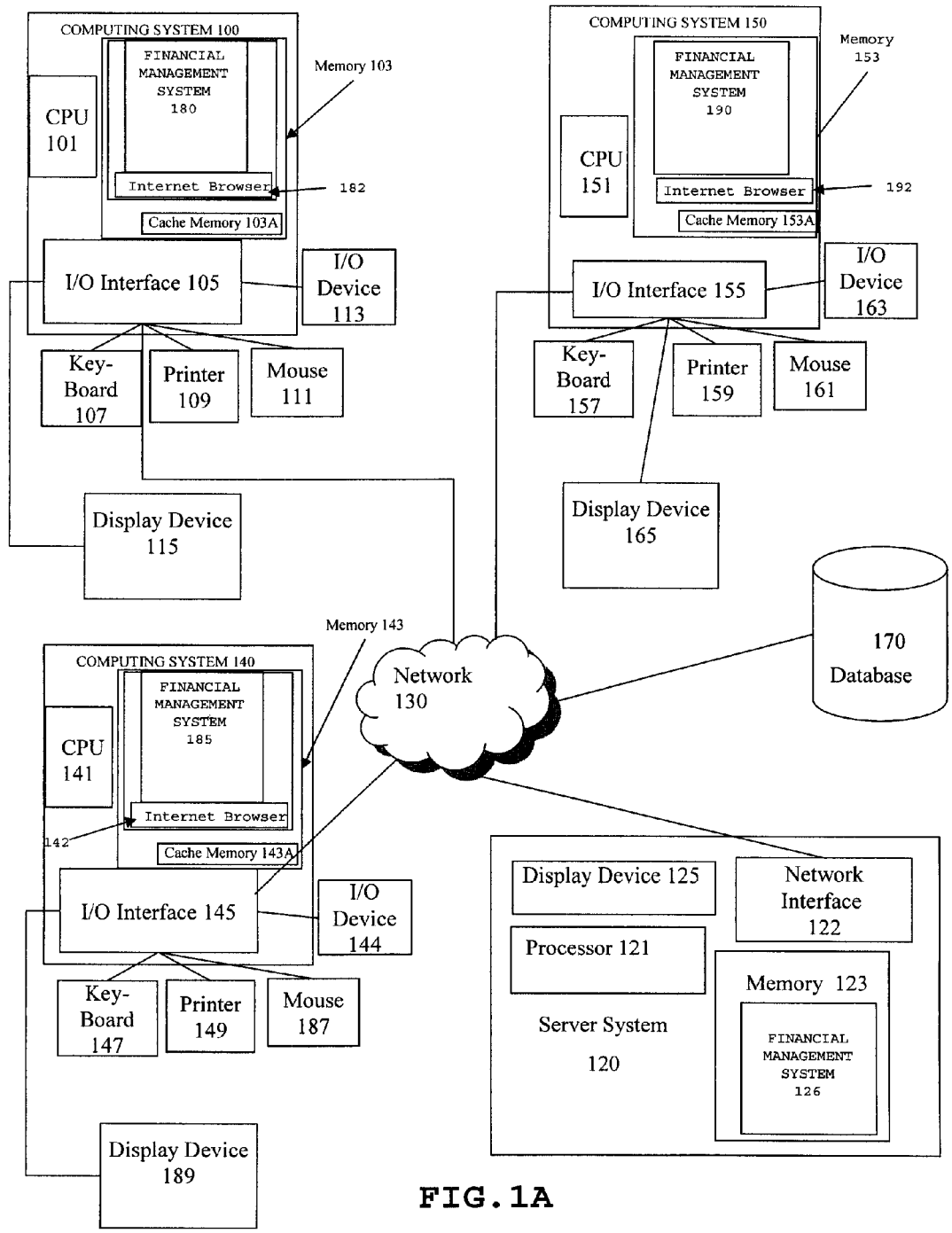
FIG. 1A is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for providing intelligent targeted budget analysis and recommendations based on financial data from similarly situated individuals includes a process for providing intelligent targeted budget analysis and recommendations based on financial data from similarly situated individuals whereby, in one embodiment, a financial management system is provided and financial data, including historical financial transaction data, associated with multiple individuals is obtained through the financial management system. In one embodiment, the financial data associated with the multiple individuals includes, but is not limited to, any one or more of: data indicating the individual's identification; data indicating the individual's income, i.e., monthly income, bi-monthly income, weekly income etc; data indicating the individual's geographical area; data indicating the individual's mortgage or rent payment, or other housing costs, such as property tax paid; data indicating balances held in investment accounts associated with the individual, in one embodiment, along with estimated investment risk; data indicating the individual's spending in defined budget categories, e.g. in the top 10 budget categories by amount spent; data indicating the expenses/bills paid by the individual, in one embodiment including amount and budget category; marital status; dependents; and/or demographic data for the given individual. In one embodiment, the financial data associated with each of the individuals is then analyzed to identify financial profile elements associated with each individual, such as, but not limited to: the individual's income; the individual's geographical area; the individual's mortgage or rent payment, or other housing costs, such as property tax paid; balances held in investment accounts associated with the individual; the individual's spending in defined budget categories; the amounts paid by the given individual in defined expense/bill budget categories; marital status; dependents; various demographic data for the given individual; and/or any other financial profile elements associated with each individual desired by the provider of the method and system for providing intelligent targeted budget analysis and recommendations based on financial data from similarly situated individuals and/or one or more individuals/users. In one embodiment, data indicating the financial profile elements associated with the each of the individuals and data linking the financial profile elements associated with the each of the individuals is stored in a financial profile database. In one embodiment, the financial data associated with a given individual is also obtained through the financial management system and includes, but not limited to, any one or more of: data indicating the individual's identification; data indicating the individual's income, i.e., monthly income, bi-monthly income, weekly income etc; data indicating the individual's geographical area; data indicating the individual's mortgage or rent payment, or other housing costs, such as property tax paid; data indicating balances held in investment accounts associated with the individual, in one embodiment, along with estimated investment risk; data indicating the individual's spending in defined budget categories, e.g. in the top 10 budget categories by amount spent; data indicating the expenses/bills paid by the individual, in one embodiment including amount and budget category; marital status; dependents; and/or demographic data for the given individual. In one embodiment, the financial data associated with the given individual is then analyzed to identify financial profile elements associated with the given individual, such as, but not limited to: the individual's income; the individual's geographical area; the individual's mortgage or rent payment, or other housing costs, such as property tax paid; balances held in investment accounts associated with the individual; the individual's spending in defined budget categories; the amounts paid by the given individual in defined expense/bill budget categories; marital status; dependents; various demographic data for the given individual; and/or any other financial profile elements associated with the given individual desired by the provider of the method and system for providing intelligent targeted budget analysis and recommendations based on financial data from similarly situated individuals and/or one or more individuals/users. In one embodiment, the financial profile elements associated with the given individual are then grouped into sets or sub-sets of financial profile elements to create one or more financial profiles for the given individual. In one embodiment, the one or more of the financial profiles for the given individual are then used to search the financial profile database to find one or more individuals of the multiple individuals that are financial peers of the given individual, i.e., that have financial profiles similar to a given financial profile for the given individual using the specific financial profile elements making up the given financial profile for the given individual. In one embodiment, the financial data associated with the identified one or more financial peers of the given individual is then analyzed, aggregated, averaged, and/or otherwise processed, to provide the given individual budget analysis data and/or one or more budget recommendations.

In one embodiment, access to the financial data associated with the multiple individuals and/or the given individual is obtained through a financial management system that implements, includes, is accessible by, and/or is otherwise associated with the process for providing intelligent targeted budget analysis and recommendations based on financial data from similarly situated individuals.

In one embodiment, the financial management system is a computing system implemented financial management system and/or an on-line financial management system.

Herein, the term financial management system includes, but is not limited to, any computing system implemented, on-line or web-based, system, package, program, module, or application that gathers financial data, has the capability to analyze and categorize at least part of the financial data into various reports or displays that are provided to the user, and provides the user with the capability to conduct, and/or monitor, financial transactions and includes a budgeting feature.

Types of financial management systems include, but are not limited to any of the following: an on-line, or web-based, or computing system implemented personal financial management system, package, program, module, or application; an on-line, or web-based, or computing system implemented personal/home business inventory system, package, program, module, or application; an on-line, or web-based, or computing system implemented personal asset management system, package, program, module, or application; an on-line, or web-based, or computing system implemented business accounting system, package, program, module, or application; an on-line, or web-based, or computing system implemented business financial management system, package, program, module, or application; an on-line, or web-based, or computing system implemented business inventory system, package, program, module, or application; an on-line, or web-based, or computing system implemented business asset management system, package, program, module, or application; an on-line, or web-based, or computing system implemented personal accounting system, package, program, module, or application; an on-line, or web-based, or computing system implemented healthcare expense tracking system, package, program, module, or application; or any on-line, or web-based, data management system as discussed herein, and/or as known in the art at the time of filing, and/or as developed after the time of filing.

Specific examples of financial management systems currently available include, but are not limited to: Quicken Finance Works™ available from Intuit Inc. of Mountain View, Calif.; Mint.com™, available from Intuit Inc. of Mountain View, Calif.; Quicken™, available from Intuit Inc. of Mountain View, Calif.; Quicken Online™, available from Intuit Inc. of Mountain View, Calif.; Quickbooks™, available from Intuit Inc. of Mountain View, Calif.; Quickbooks Online™, available from Intuit Inc. of Mountain View, Calif.; Quicken Healthcare Expense Tracker™ available from Intuit Inc. of Mountain View, Calif.; Microsoft Money™, available from Microsoft, Inc. of Redmond, Wash.; or various other financial management systems discussed herein, or known to those of skill in the art at the time of filing, or as developed after the time of filing.

In one embodiment, historical financial transaction data associated with the multiple individuals and/or the given individual is obtained through the financial management system for a defined time frame.

In various embodiments, the defined time frame can be any time frame desired such as, but not limited to: days, weeks, months, years, etc. In various embodiments, the defined time frame is determined based, at least in part, on the pay period of the individual.

In one embodiment, the historical financial transaction data associated with the multiple individuals and/or the given individual is provided to, and/or entered into, and/or transferred to, and/or downloaded to, and/or otherwise obtained by, the process for providing intelligent targeted budget analysis and recommendations based on financial data from similarly situated individuals and/or the financial management system associated with the process for providing intelligent targeted budget analysis and recommendations based on financial data from similarly situated individuals from the individuals, a bank, credit card company, a credit reporting agency or bureau, and/or any other financial institution or data source via any network or network system, as discussed herein, and/or available or known at the time of filing, and/or as later developed.

In one embodiment, the historical financial transaction data associated with the multiple individuals and/or the given individual is provided to, and/or entered into, and/or transferred to, and/or downloaded to, and/or otherwise obtained by, the process for providing intelligent targeted budget analysis and recommendations based on financial data from similarly situated individuals and/or the financial management system associated with the process for providing intelligent targeted budget analysis and recommendations based on financial data from similarly situated individuals from the individuals, a bank, credit card company, a credit reporting agency or bureau, and/or any other financial institution or data source through a user interface device, such as a keyboard, mouse, touchpad, voice recognition software, or any other device and/or system capable of providing user input to a computing system and/or for translating user actions into computing system operations, whether available or known at the time of filing or as developed later.

In one embodiment, the historical financial transaction data associated with the multiple individuals and/or the given individual is provided to, and/or entered into, and/or transferred to, and/or downloaded to, and/or otherwise obtained by, the process for providing intelligent targeted budget analysis and recommendations based on financial data from similarly situated individuals and/or the financial management system associated with the process for providing intelligent targeted budget analysis and recommendations based on financial data from similarly situated individuals from the individuals, a bank, credit card company, a credit reporting agency or bureau, and/or any other financial institution or data source via a database, such as any database as discussed herein, and/or available or known at the time of filing, and/or as later developed.

In one embodiment, the historical financial transaction data associated with the multiple individuals and/or the given individual is provided to, and/or entered into, and/or transferred to, and/or downloaded to, and/or otherwise obtained by, the process for providing intelligent targeted budget analysis and recommendations based on financial data from similarly situated individuals and/or the financial management system associated with the process for providing intelligent targeted budget analysis and recommendations based on financial data from similarly situated individuals from the individuals, a bank, credit card company, a credit reporting agency or bureau, and/or any other financial institution or data source by embedding the data in, or on, a computer program product, as discussed herein and providing the computer program product to the provider of financial management system associated with the process for providing intelligent targeted budget analysis and recommendations based on financial data from similarly situated individuals and/or the process for providing intelligent targeted budget analysis and recommendations based on financial data from similarly situated individuals.

In one embodiment, the historical financial transaction data associated with the multiple individuals and/or the given individual is provided to, and/or entered into, and/or transferred to, and/or downloaded to, and/or otherwise obtained by, the process for providing intelligent targeted budget analysis and recommendations based on financial data from similarly situated individuals and/or the financial management system associated with the process for providing intelligent targeted budget analysis and recommendations based on financial data from similarly situated individuals from the individuals, a bank, credit card company, a credit reporting agency or bureau, and/or any other financial institution or data source via any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In various embodiments, the financial data associated with the given individual and/or multiple other individuals includes but is not limited to, data indicating: the individual's identification; the individual's income, i.e., monthly income, bi-monthly income, weekly income etc; the individual's geographical area or residence or employment; the individual's spending in defined budget categories, e.g. in the top 10 budget categories by amount spent; the individual's budgets and/or budget categories; the individual's spending in one or more budget categories; the individual's age; the individual's marital status; the individual's dependents; the individual's occupation; the individual's household income, from all sources; the individual's average contributions to saving accounts and/or programs over a given time; the individual's savings account balances; the individual's average contributions to retirement accounts and/or programs over a given time; the individual's balances in retirement accounts and/or programs; the individual's average balances in checking; the individual's mortgage/rent payments or other housing costs, such as property tax paid; the individual's equity in real estate; the individual's stocks and other holdings and, in one embodiment, the estimated risk of these holdings; the individual's healthcare expenses; the individual's financial transaction data, including specific spending in defined categories and/or with specific merchants; and/or any other financial and/or demographic data desired/defined by the provider of the process for providing intelligent targeted budget analysis and recommendations based on financial data from similarly situated individuals and/or a user of the process for providing intelligent targeted budget analysis and recommendations based on financial data from similarly situated individuals.

In one embodiment, the financial data associated with the given individual and/or multiple other individuals is analyzed by one or more processors associated with one or more computing systems to identify one or more financial profile elements associated with each individual, such as, but not limited to: income; geographical area or residence or employment; spending in defined budget categories, e.g. in the top 10 budget categories by amount spent; budgets and/or budget categories; spending in one or more budget categories; age; marital status; number of dependents; occupation; household income, from all sources; average contributions to saving accounts and/or programs over a given time; savings account balances; average contributions to retirement accounts and/or programs over a given time; balances in retirement accounts and/or programs; average balances in checking; mortgage/rent payments or other housing costs, such as property tax paid; equity in real estate; stocks and other holdings and, in one embodiment, the estimated risk of these holdings; healthcare expenses; specific spending in defined categories and/or with specific merchants; and/or any other financial profile elements associated with each individual desired by the provider of the method and system for providing intelligent targeted budget analysis and recommendations based on financial data from similarly situated individuals and/or one or more individuals/users.

In one embodiment, data indicating the financial profile elements associated with the each of the individuals and data linking the financial profile elements associated with the each of the individuals is stored in a financial profile database that can be, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

As noted above, in one embodiment, the financial data associated with a given individual is also obtained through the financial management system and includes, but not limited to, data indicating: the given individual's identification; the given individual's income, i.e., monthly income, bi-monthly income, weekly income etc; the given individual's geographical area or residence or employment; the given individual's spending in defined budget categories, e.g. in the top 10 budget categories by amount spent; the given individual's budgets and/or budget categories; the given individual's spending in one or more budget categories; the given individual's age; the given individual's marital status; the given individual's dependents; the given individual's occupation; the given individual's household income, from all sources; the given individual's average contributions to saving accounts and/or programs over a given time; the given individual's savings account balances; the given individual's average contributions to retirement accounts and/or programs over a given time; the given individual's balances in retirement accounts and/or programs; the given individual's average balances in checking; the given individual's mortgage/rent payments or other housing costs, such as property tax paid; the given individual's equity in real estate; the given individual's stocks and other holdings and, in one embodiment, the estimated risk of these holdings; the given individual's healthcare expenses; the given individual's financial transaction data, including specific spending in defined categories and/or with specific merchants; and/or any other financial and/or demographic data desired/defined by the provider of the process for providing intelligent targeted budget analysis and recommendations based on financial data from similarly situated individuals and/or a user of the process for providing intelligent targeted budget analysis and recommendations based on financial data from similarly situated individuals.

As also noted above, in one embodiment, the financial data associated with the given individual is analyzed by one or more processors associated with one or more computing systems to identify one or more financial profile elements associated with the given individual, such as, but not limited to:

income; geographical area or residence or employment; spending in defined budget categories, e.g. in the top 10 budget categories by amount spent; budgets and/or budget categories; spending in one or more budget categories; age; marital status; number of dependents; occupation; household income, from all sources; average contributions to saving accounts and/or programs over a given time; savings account balances; average contributions to retirement accounts and/or programs over a given time; balances in retirement accounts and/or programs; average balances in checking; mortgage/rent payments or other housing costs, such as property tax paid; equity in real estate; stocks and other holdings and, in one embodiment, the estimated risk of these holdings; healthcare expenses; specific spending in defined categories and/or with specific merchants; and/or any other financial profile elements associated with each individual desired by the provider of the method and system for providing intelligent targeted budget analysis and recommendations based on financial data from similarly situated individuals and/or one or more individuals/users.

In one embodiment, the financial profile elements associated with the given individual are then grouped into sets or sub-sets, in one embodiment pairs, of financial profile elements to create one or more financial profiles for the given individual. In one embodiment, the financial profile elements associated with the given individual are then grouped into sets or sub-sets, in one embodiment pairs, of financial profile elements to create one or more financial profiles for the given individual using input from the given individual. In one embodiment, the financial profile elements associated with the given individual are then grouped into sets or sub-sets, in one embodiment pairs, of financial profile elements to create one or more financial profiles for the given individual automatically by the process for providing intelligent targeted budget analysis and recommendations based on financial data from similarly situated individuals. In one embodiment, the financial profile elements associated with the given individual are then grouped into sets or sub-sets, in one embodiment pairs, of financial profile elements to create one or more financial profiles for the given individual semi-automatically by the process for providing intelligent targeted budget analysis and recommendations based on financial data from similarly situated individuals, pending user approval.

In one embodiment, the one or more of the financial profiles for the given individual, and/or financial profile elements associated with the given individual, are then used to search the financial profile database to find one or more individuals of the multiple other individuals that are financial peers of the given individual, i.e., that have financial profile element values similar to a given financial profile value for the given individual using the specific financial profile elements making up the given financial profile for the given individual.

In one embodiment, the one or more of the financial profiles for the given individual, and/or financial profile elements associated with the given individual, are used to search the financial profile database under the direction of one or more processors associated with one or more computing systems.

In one embodiment, the financial data associated with the identified one or more financial peers of the given individual is then analyzed, aggregated, averaged, and/or otherwise processed, to provide the given individual budgetary analysis and/or one or more budget recommendations.

In one embodiment, the financial data associated with the identified one or more financial peers of the given individual is then analyzed, aggregated, averaged, and/or otherwise processed, to provide the given individual budgetary analysis and/or one or more budget recommendations using one or more processors associated with one or more computing systems.

As a specific illustrative example of one embodiment, the method and system for providing intelligent targeted budget analysis and recommendations based on financial data from similarly situated individuals includes three major components: budget data capturing component; an individual profiling component; and a budget recommendation/analysis component.

As a specific illustrative example of one embodiment, it is stipulated that at the budget data capturing component a given individual and at least one other individual use a financial management system, such as a personal financial management system. In this specific example, once an individual creates an account/presence through the financial management system the budget data capturing component obtains and stores the following data: the individual's identification (for storing personalized budget preferences); the individual's monthly income (weekly, bi-monthly etc, as applicable); the individual's geographical area; the individual's mortgage or rent amount; amount held in investment accounts associated with the individual, along with estimated investment risk; the individual's spending in defined categories, for instance in the top 10 spending categories; and expense/bill information associated with the individual, i.e., amount and budget category.

In this specific illustrative example of one embodiment, this financial data is obtained/sent only when an individual creates an account/presence through the financial management system and/or if any of the above data changes, i.e., the individual earns more, changes location etc.

In this specific illustrative example of one embodiment, at the budget data capturing component, when the individual takes an action affecting their budget, i.e., changes the existing budget, creates new budget, etc., the budgeted category affected and the budgeted amount affected is captured and/or updated.

In this specific illustrative example of one embodiment, at the budget data capturing component, the financial data for the given individual and the at least one other individual is used to create three data tables.

In this specific illustrative example of one embodiment, the first table is a "given individual financial data table", which holds the given individual financial data disused above correlated to the given individual. For example, an entry in the given individual financial data table for a given individual with ID 100 may show a mortgage payment of 1500.00 associated with the given individual and a zip code of 90210 associated with the given individual.

In this specific illustrative example of one embodiment, the second table is a "given individual's budget table". In this specific illustrative example of one embodiment, the given individual's budget table includes given individual-specific budget info such as category and amount. For example the given individual's budget table may indicate the given individual with ID 100 has three budget categories and amounts: groceries $500, entertainment $200 and dining out $240.

In this specific illustrative example of one embodiment, the third table is an "other individuals' contribution table". In this specific illustrative example of one embodiment, the other individuals' contribution table includes the given individual's information, in one embodiment as a given individual's profile as supplied by individual profiling component discussed below, as well as the number of other individuals with a similar financial profile that are contributing data. As an example, the data in the other individuals' contribution table may indicate "13 other individual's with incomes similar to the given individual's income and in the given individual's general area of residence, i.e., zip code, have set up category groceries with average $450". Another row/entry might indicate "14 other individual's with mortgage payment similar to the given individual's mortgage payment and in the given individual's general area of residence, i.e., zip code, have set up groceries category with average $621".

As discussed below, in this specific illustrative example of one embodiment, the data from the other individuals' contribution table is then used by the budget recommendation/analysis component.

In this specific illustrative example of one embodiment, the individual profiling component is provided the set of financial data for the given individual and at least one other individual and then the data is processed and transformed into pre-defined financial profiles. In this specific illustrative example of one embodiment, a financial profile is a pair of financial profile elements and/or financial profile element values selected from the financial data for the given individual and at least one other individual. For example, one financial profile might be the (area, mortgage) pair.

In this specific illustrative example of one embodiment, a complete financial profile is a set of one or more above mentioned financial profile pairs. As an example, a complete financial profile might include variations of input data paired with area such as, but not limited to: (area, income), (area, mortgage) etc. Additionally, more combinations can be added to create a more complete financial profile set such as, but not limited to (income, mortgage), etc.

For instance, a complete user profile may be, for example, (zip 90210, $2000 income), (zip 90210, $1400 spending on food), etc.

In this specific illustrative example of one embodiment, the individual profiling component uses the aforementioned given individual financial data table of the budget data capturing component to determine a complete financial profile for a given individual in a form of a financial profile vector. This financial profile vector's primary purpose is to serve as key in the other individuals' contribution table of the budget data capturing component.

In this specific illustrative example of one embodiment, the budget recommendation/analysis component obtains the identification data associated with the given individual and the given individual's financial profile data and uses the given individual's financial profile to iterate through financial profile element pairs, and for every financial profile element pair, a search is performed in the other individuals' contribution table to find financial profile elements pairs of similarly situated other individuals.

In various instances, the search may be based on permissiveness parameters. As an example, for income the permissiveness parameter can be +−5% of this given individual's income or geographically within 50 miles of the given individual's residence.

When a defined number of financial profile elements pairs of similarly situated other individuals have been matched, the result is budget data for other individuals who are similarly situated or "financial peers" of the given individual. In various instances, several different budgets and/or budget entries are obtained and the budgets and/or budget entries are averaged, weighted, and/or otherwise processed so as to transform the data into an intelligent targeted budget for the given individual.

In this specific illustrative example of one embodiment, a threshold number of matches are required for each financial profile element pair. As an example, a minimum of 10. In some cases, when a financial profile element pair does not have the threshold number of matches that financial profile element pair will not be considered valid, but for all others, the number of matches will be the weighting factor in calculating final budgets.

As an even more specific illustration of one embodiment, let us stipulate that a given individual creates an account, or joins, a financial management system that is associated with the method and system for providing intelligent targeted budget analysis and recommendations based on financial data from similarly situated individuals discussed herein.

Let us further stipulate that the given individual downloads financial data, including financial transaction data from one or more of their associated Financial Institutions (FIs). In one embodiment, the financial data is analyzed and it is determined that the given individual: has a $3000 monthly income; pays $500 rent; has no investments; pays $50 a month for cable; pays $300 a month in electricity bills; lives in San Jose, Calif. and spends identified amounts in 10 budget categories, for instance, $450 on home repair.

In one embodiment, the financial management system directs the budget data capturing component to register the given individual, assign the given individual the ID 100, and to store data indicating the financial information above in an account for the given individual.

In one embodiment, when the given individual requests budget analysis and/or recommendations, the financial management system directs the budget recommendation/analysis component to provide an analysis by providing the given individual's ID number 100.

In one embodiment, the budget recommendation/analysis component requests that the individual profiling component to provide financial profile and/or financial profile element data, e.g., financial profile vector data. In this specific example, the financial profile vector data would include the financial profile element pairs: {(San Jose, $3000 income); (San Jose, $500 rent); (San Jose, $50 cable bill); (San Jose, $450 home repair spending in May)}, etc.

In one embodiment, the budget recommendation/analysis component uses this financial profile vector data to perform a look up iteratively in the other individuals' contribution table of the budget data capturing component. In one embodiment, the budget recommendation/analysis component will take (San Jose+−50 miles, $3000+−5% income) and this will yield in say 3 budget categories: (groceries, $400, 13 people), (entertainment, $200, 10 people) and (dining out, $340, 22 people). Iteration on 2nd element of the financial profile vector data may yield (groceries, $420, 15 people), (entertainment, $220, 12 people) and (coffee, $140, 16 people) and so on.

In one embodiment, the budget recommendation/analysis component processes the data and tallies the results in a single budget vector. In one embodiment, if above data were the only values retrieved, the budget recommendation/analysis component would recommend the following budget: (groceries, $411); (entertainment, $211); (dining out, $340); and (coffee, $140).

For clarification, as an example, in this embodiment, a weighted average is used. For example, (groceries, $411) was calculated as follows: ($400*13 people+$420*15 people)/28 contributors=$411.

In one embodiment, if the given individual decides to customize the coffee budget to $160, the change is provided to the budget data capturing component and the financial profile for the given individual is modified to (ID 100, coffee, $160). In one embodiment, the budget data capturing component will add an entry to given individual's own "given individual's budget table" to include this new budget. In addition, in one embodiment, the budget data capturing component will also modify the set of coffee records in the "other individuals' contribution table".

FIG. 1A is a block diagram of an exemplary hardware architecture for implementing one embodiment of a system and method for providing intelligent targeted budget analysis and recommendations based on financial data from similarly situated individuals, such as exemplary process 200 (FIG. 2) discussed herein, that, returning to FIG. 1A, includes: a computing system 100, e.g., a first computing system; a computing system 150, e.g., a second computing system; a computing system 140, e.g., a third computing system; a server system 120; and a database 170, all operatively coupled by a network 130.

As seen in FIG. 1A, computing system 100 typically includes a central processing unit (CPU) 101, an input/output (I/O) interface 105, and a memory system 103, including cache memory 103A. In one embodiment, memory system 103 includes all, or part, of a financial management system 180, such as any financial management system defined herein, known in the art at the time of filing, and/or as developed thereafter. In one embodiment, financial management system 180 is stored, in whole, or in part, in memory system 103, and is used by, or includes, or is accessed by, a process for providing intelligent targeted budget analysis and recommendations based on financial data from similarly situated individuals (not shown in FIG. 1A, see FIG. 2) and/or a given individual.

Returning to FIG. 1A, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for providing intelligent targeted budget analysis and recommendations based on financial data from similarly situated individuals, and/or a financial management system, are entered, in whole, or in part, into computing system 100 via I/O device 113, such as from a CD, DVD, floppy disk, portable hard drive, memory stick, download site, or other medium and/or computer program product as discussed herein.

In one embodiment, computing system 100 also includes an Internet browser capability 182 that, in one embodiment, includes a search engine (not shown) and is stored, in whole, or in part in memory 103.

In one embodiment, financial data associated with a given individual is stored, in whole, or in part, in memory system 103, and is used by, or is accessed by, a process for providing intelligent targeted budget analysis and recommendations based on financial data from similarly situated individuals and/or one or more users. In one embodiment, computing system 100 is a computing system accessible by one or more users. In one embodiment, computing system 100 is used, and/or accessible, by another computing system, such as computing systems 150 and/or 140 (discussed below).

In one embodiment, computing system 100 is used, controlled, provided, and/or otherwise associated with a given individual and/or an authorized user that is a representative of the given individual, and data representing all, or part, of financial data associated with the given individual, is stored in computing system 100.

Computing system 100 can be any computing system as discussed herein and/or as known in the art at the time of filing and/or as developed thereafter, that includes components that can execute all, or part, of a process for providing intelligent targeted budget analysis and recommendations based on financial data from similarly situated individuals, and/or a financial management system, in accordance with at least one of the embodiments as described herein.

As also seen in FIG. 1A, computing system 150 typically includes a central processing unit (CPU) 151, an input/output (I/O) interface 155, and a memory system 153, including cache memory 153A. In one embodiment, memory system 153 includes all, or part, of a financial management system 190, such as any financial management system defined herein, known in the art at the time of filing, and/or as developed thereafter. In one embodiment, financial management system 190 is stored, in whole, or in part, in memory system 153, and is used by, or includes, or is accessed by, and/or is otherwise associated with a process for providing intelligent targeted budget analysis and recommendations based on financial data from similarly situated individuals (not shown in FIG. 1A, see FIG. 2) and/or one or more other individuals, i.e., an individual other than the given individual.

Returning to FIG. 1A, computing system 150 may further include standard user interface devices such as a keyboard 157, a mouse 161, a printer 159, and a display device 165, as well as, one or more standard input/output (I/O) devices 163, such as a compact disk (CD) or Digital Video Disc (DVD) drive, floppy disk drive, or other digital or waveform port, or other device capable of inputting data to, and outputting data from, computing system 150, whether available or known at the time of filing or as later developed. As discussed in more detail below, in one embodiment, a process for providing intelligent targeted budget analysis and recommendations based on financial data from similarly situated individuals, and/or a financial management system, are entered, in whole, or in part, into computing system 150 via I/O device 163, such as from a CD, DVD, floppy disk, portable hard drive, memory stick, download site, or other medium and/or computer program product as discussed herein.

In one embodiment, computing system 150 also includes an Internet browser capability 192 that, in one embodiment, includes a search engine (not shown) and is stored, in whole, or in part in memory 153.

In one embodiment, data associated one or more other individuals is stored, in whole, or in part, in memory system 153, and is used by, or is accessed by, a process for providing intelligent targeted budget analysis and recommendations based on financial data from similarly situated individuals and/or one or more users. In one embodiment, computing system 150 is a computing system accessible by one or more users. In one embodiment, computing system 150 is used, and/or accessible, by another computing system, such as computing systems 100 and/or 140 (discussed below).

Computing system 150 can be any computing system as discussed herein and/or as known in the art at the time of filing and/or as developed thereafter, that includes components that can execute all, or part, of a process for providing intelligent targeted budget analysis and recommendations based on financial data from similarly situated individuals, and/or a financial management system, in accordance with at least one of the embodiments as described herein.

As also seen in FIG. 1A, computing system 140 typically includes a central processing unit (CPU) 141, an input/output (I/O) interface 145, and a memory system 143, including cache memory 143A. In one embodiment, memory system 143 includes all, or part, of a financial management system

185, such as any computing system implemented data management system defined herein, known in the art at the time of filing, and/or as developed thereafter. In one embodiment, financial management system 185 is stored, in whole, or in part, in memory system 143, and is used by, or includes, or is accessed by, a process for providing intelligent targeted budget analysis and recommendations based on financial data from similarly situated individuals (not shown in FIG. 1A, see FIG. 2) and/or one or more other individuals.

Returning to FIG. 1A, computing system 140 may further include standard user interface devices such as a keyboard 147, a mouse 187, a printer 149, and a display device 189, as well as, one or more standard input/output (I/O) devices 144, such as a compact disk (CD) or Digital Video Disc (DVD) drive, floppy disk drive, or other digital or waveform port, or other device capable of inputting data to, and outputting data from, computing system 140, whether available or known at the time of filing or as later developed. As discussed in more detail below, in one embodiment, a process for providing intelligent targeted budget analysis and recommendations based on financial data from similarly situated individuals, and/or a computing system implemented data management system, are entered, in whole, or in part, into computing system 140 via I/O device 144, such as from a CD, DVD, floppy disk, portable hard drive, memory stick, download site, or other medium and/or computer program product as discussed herein.

In one embodiment, computing system 140 also includes an Internet browser capability 142 that, in one embodiment, includes a search engine (not shown) and is stored, in whole, or in part in memory 143.

In one embodiment, data associated with a process for providing intelligent targeted budget analysis and recommendations based on financial data from similarly situated individuals and/or one or more individuals is stored, in whole, or in part, in memory system 143. In one embodiment, computing system 140 is a computing system accessible by one or more users. In one embodiment, computing system 140 is used, and/or accessible, by another computing system, such as computing systems 150 and/or 100.

Computing system 140 can be any computing system as discussed herein and/or as known in the art at the time of filing and/or as developed thereafter, that includes components that can execute all, or part, of a process for providing intelligent targeted budget analysis and recommendations based on financial data from similarly situated individuals, and/or a computing system implemented data management system, in accordance with at least one of the embodiments as described herein.

Also shown in FIG. 1A is database 170. In one embodiment, database 170 is a data storage device, a designated server system or computing system, or a designated portion of one or more server systems or computing systems, such as computing systems 100, 140, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is a financial profile database under the control of, or otherwise accessible by, a process for providing intelligent targeted budget analysis and recommendations based on financial data from similarly situated individuals, and/or a financial management system and/or a computing system implemented data management system.

In one embodiment, financial data associated with one or more individuals, and/or a process for providing intelligent targeted budget analysis and recommendations based on financial data from similarly situated individuals, and/or one or more financial management systems, and/or one or more computing system implemented data management systems, is stored, in whole, or in part, in database 170, and is used by, or is accessed by, a process for providing intelligent targeted budget analysis and recommendations based on financial data from similarly situated individuals. In one embodiment, database 170 is accessible by one or more users. In one embodiment, database 170 is used, and/or accessible, by a computing system, such as computing systems 100, 140, and/or 150, and/or a server system, such as sever system 120 (discussed below).

In one embodiment, computing systems 100, 140, and 150, and database 170, are coupled to a server system 120 through network 130. In one embodiment, server system 120 includes a server system display device 125, a server system processor 121, a server system memory 123, and a server system network interface 122.

In one embodiment, server system memory 123 includes all, or part, of a financial management system 126, such as any financial management system defined herein, known in the art at the time of filing, and/or as developed thereafter. In one embodiment, financial management system 126 is stored, in whole, or in part, in memory system 123, and is used by, or includes, or is accessed by, and/or is otherwise associated with a process for providing intelligent targeted budget analysis and recommendations based on financial data from similarly situated individuals (not shown in FIG. 1A, see FIG. 2) and/or one or more individuals, i.e., the given individual and/or any individuals other than the given individual.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, data associated with one or more individuals, and/or a process for providing intelligent targeted budget analysis and recommendations based on financial data from similarly situated individuals, and/or one or more financial management systems, and/or one or more computing system implemented data management systems, is stored, in whole, or in part, in server system 120, and is used by, or is accessed by, a process for providing intelligent targeted budget analysis and recommendations based on financial data from similarly situated individuals. In one embodiment, server system 120 is accessible by one or more users. In one embodiment, server system 120 is used, and/or accessible, by a computing system, such as computing systems 100, 140, and/or 150, and/or one or more databases, such as database 170.

Network 130 can be any network or network system as discussed herein, and/or known in the art at the time of filing, and/or as developed after the time of filing, capable of allowing communication between two or more computing systems, server systems, and/or databases.

In on embodiment, computing systems 100, 140, and 150, and database 170, and server system 120 are part of a cloud computing environment.

Those of skill in the art will readily recognize that the components shown in FIG. 1A, such as computing systems 100, 140, and 150, database 170, server system 120, and their respective components, are shown for illustrative purposes only and that architectures with more or fewer components can implement, and benefit from, one or more embodiments. Moreover, one or more components of computing system 100, computing system 140, computing system 150, database 170, and server system 120 may be located remotely from their respective system and accessed via network 130. In addition, the particular type of, and configuration of, computing systems 100, 140, and 150, database 170, and server system 120 are not relevant.

As discussed in more detail below, in one embodiment, a process for providing intelligent targeted budget analysis and recommendations based on financial data from similarly situated individuals, and/or a financial management system, and/or a computing system implemented data management system, and/or data associated with one or more individuals, is stored, in whole, or in part, in memory system 103 and/or cache memory 103A, of computing system 100, in memory system 143 and/or cache memory 143A, of computing system 140, and/or memory system 153 and/or cache memory 153A of computing system 150, and/or in server memory system 123 of server system 120 and/or in database 170, and executed on computing system 100, and/or computing system 140, and/or computing system 150. As used herein, a memory refers to a volatile memory, a non-volatile memory, or any combination of the two.

Figure 1B:
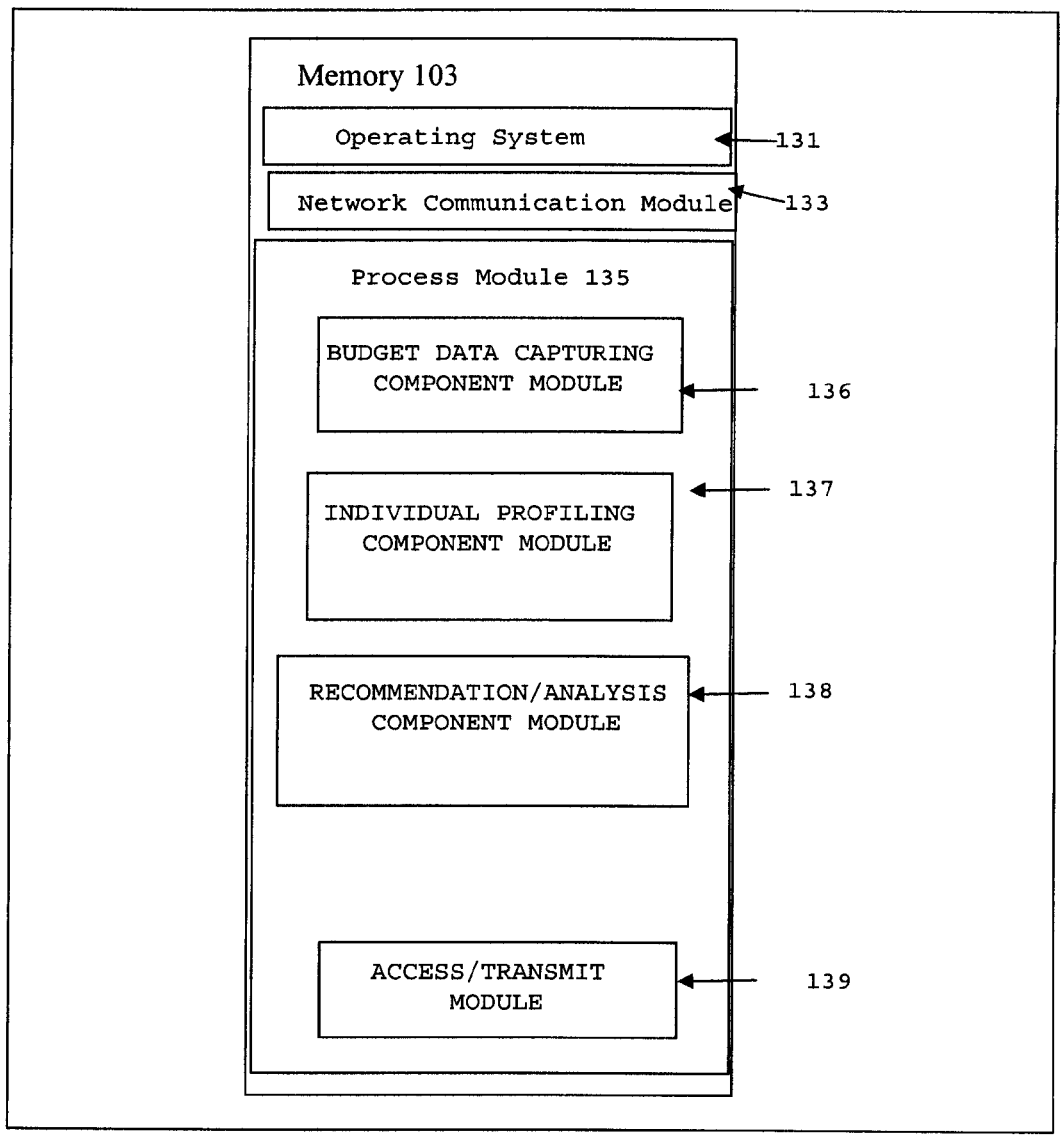
FIG. 1B is a block diagram of an exemplary memory system associated with an exemplary computing system in accordance with one embodiment.

FIG. 1B is a more detailed block diagram of an exemplary memory system 103 of computing system 100 of FIG. 1A. As seen in FIG. 1B, memory system 103 can store data and/or instructions associated with, but not limited to, the following elements, subsets of elements, and/or super-sets of elements for processing by one or more processors: operating system 131 that includes procedures, data, and/or instructions for handling various services and performing/coordinating hardware dependent tasks; network communications module 133 that includes procedures, data, and/or instructions, for connecting computing system 100 to other computing systems, such as computing system 140 and/or 150 and/or server system 120 of FIG. 1A, and/or one or more networks, such as network 130 of FIG. 1A, and/or a database, such as database 170 of FIG. 1A; and process module 135 that includes procedures, data, and/or instructions, associated with a process for providing intelligent targeted budget analysis and recommendations based on financial data from similarly situated individuals.

As also seen in FIG. 1B, process module 135 includes budget data capturing component module 136 that includes procedures, data, and/or instructions, for obtaining, processing, and/or storing at least part of the following data for one or more individuals: the individual's identification (for storing personalized budget preferences); the individual's monthly income (weekly, bi-monthly etc, as applicable); the individual's geographical area; the individual's mortgage or rent amount; amount held in investment accounts associated with the individual, along with estimated investment risk; the individual's spending in defined categories, for instance in the top 10 spending categories; and expense/bill information associated with the individual, i.e., amount and budget category.

As also seen in FIG. 1B, in one embodiment, process module 135 includes individual profiling component module 137 that includes procedures, data, and/or instructions, for obtaining, processing and/or storing data the set of financial data for a given individual and at least one other individual from budget data capturing component module 136 and transforming the data into financial profiles.

As also seen in FIG. 1B, in one embodiment, process module 135 includes recommendation/analysis component module 138 that includes procedures, data, and/or instructions, for obtaining, processing and/or storing the identification data associated with the given individual and the given individual's financial profile data and using the given individual's financial profile to search for financial profiles of similarly situated other individuals.

As also seen in FIG. 1B, in one embodiment, process module 135 access/transmit module 139 that includes procedures, data, and/or instructions, for providing a given individual budget analysis data and/or one or more budget recommendations.

Those of skill in the art will readily recognize that the choice of components, data, modules, and information shown in FIG. 1B, the organization of the components, data, modules, and information shown in FIG. 1B, and the manner of storage and location of storage of the data, modules, and information shown in FIG. 1B was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 1B are illustrative only and not limiting. In various other embodiments, the particular modules and/or data shown in FIG. 1B can be grouped together in fewer modules and/or data locations or divided among more modules and/or data locations. Consequently, those of skill in the art will recognize that other orders and/or grouping are possible and the particular modules and/or data, order, and/or grouping shown in FIG. 1B discussed herein do not limit the scope as claimed below.

Although a process for providing intelligent targeted budget analysis and recommendations based on financial data from similarly situated individuals, and/or a financial management system, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing intelligent targeted budget analysis and recommendations based on financial data from similarly situated individuals, and/or a financial management system, and/or a computing system implemented data management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101, 141, and 150, or server system processor 121. In one embodiment, execution of a process by CPU 101, CPU 141, CPU 150, or server system processor 121, results in the operations of an agent computer process (not shown) and/or a rule computer process (not shown).

In one embodiment, a process for providing intelligent targeted budget analysis and recommendations based on financial data from similarly situated individuals, and/or a financial management system, and/or a computing system implemented data management system, and/or data associated with one or more individuals, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1A, or other media or process capable of delivering computer readable data representing computer readable code, whether available or known at the time of filing or as later developed. This medium may belong to a computing system, such as computing systems 100 and 150 of FIG. 1A, described above. However, in some embodiments, the medium also may be removable and/or remote from the computing system.

Process

Herein, the terms "individual", "given individual", "other individuals", "multiple individuals", "one or more other individuals", "one or more individuals", "user/individual", and "user" include any person, party, business, system, application, organization, and/or entity interacting with, interfacing with, contacting, viewing, providing data to, accepting data from, requesting data from, and/or otherwise associating with the process for providing intelligent targeted budget analysis and recommendations based on financial data from similarly situated individuals for any purpose.

Herein the term "financial institution" includes any entity, party, person, application and/or system, such as, but not limited to, banks, credit card companies, asset account companies, and/or investment firms, that engages in money/asset/debt management and/or financial transaction management/recording and/or display.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented data management system" includes, but is not limited to: computing system implemented accounting and/or invoicing systems, packages, programs, modules, or applications; financial management systems, packages, programs, modules, or applications; financial management systems, packages, programs, modules, or applications; computing system implemented banking systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filing or as developed later.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In accordance with one embodiment, a method and system for providing intelligent targeted budget analysis and recommendations based on financial data from similarly situated individuals includes a process for providing intelligent targeted budget analysis and recommendations based on financial data from similarly situated individuals whereby, in one embodiment, a financial management system is provided and financial data, including historical financial transaction data, associated with multiple individuals is obtained through the financial management system. In one embodiment, the financial data associated with the multiple individuals includes, but not limited to, any one or more of: data indicating the individual's identification; data indicating the individual's income, i.e., monthly income, bi-monthly income, weekly income etc; data indicating the individual's geographical area; data indicating the individual's mortgage or rent payment, or other housing costs, such as property tax paid; data indicating balances held in investment accounts associated with the individual, in one embodiment, along with estimated investment risk; data indicating the individual's spending in defined budget categories, e.g. in the top 10 budget categories by amount spent; data indicating the expenses/bills paid by the individual, in one embodiment including amount and budget category; marital status; dependents; and/or demographic data for the given individual. In one embodiment, the financial data associated with each of the individuals is then analyzed to identify financial profile elements associated with each individual, such as, but not limited to: the individual's income; the individual's geographical area; the individual's mortgage or rent payment, or other housing costs, such as property tax paid; balances held in investment accounts associated with the individual; the individual's spending in defined budget categories; the amounts paid by the given individual in defined expense/bill budget categories; marital status; dependents; various demographic data for the given individual; and/or any other financial profile elements associated with each individual desired by the provider of the method and system for providing intelligent targeted budget analysis and recommendations based on financial data from similarly situated individuals and/or one or more individuals/users. In one embodiment, data indicating the financial profile elements associated with the each of the individuals and data linking the financial profile elements associated with the each of the individuals is stored in a financial profile database. In one embodiment, the financial data associated with a given individual is also obtained through the financial management system and includes, but is not limited to, any one or more of: data indicating the individual's identification; data indicating the individual's income, i.e., monthly income, bi-monthly income, weekly income etc; data indicating the individual's geographical area; data indicating the individual's mortgage or rent payment, or other housing costs, such as property tax paid; data indicating balances held in investment accounts associated with the individual, in one embodiment, along with estimated investment risk; data indicating the individual's spending in defined budget categories, e.g. in the top 10 budget categories by amount spent; data indicating the expenses/bills paid by the individual, in one embodiment including amount and budget category; marital status; dependents; and/or demographic data for the given individual. In one embodiment, the financial data associated with the given individual is then analyzed to identify financial profile elements associated with the given individual, such as, but not limited to: the individual's income; the individual's geographical area; the individual's mortgage or rent payment, or other housing costs, such as property tax paid; balances held in investment accounts associated with the individual; the individual's spending in defined budget categories; the amounts paid by the given individual in defined expense/bill budget categories; marital status; dependents; various demographic data for the given individual; and/or any other financial profile elements associated with the given individual desired by the provider of the method and system for providing intelligent targeted budget analysis and recommendations based on financial data from similarly situated individuals and/or one or more individuals/users. In one embodiment, the financial profile elements associated with the given individual are then grouped into sets or sub-sets of financial profile elements to create one or more financial profiles for the given individual. In one embodiment, the one or more of the financial profiles for the given individual are then used to search the financial profile database to find one or more individuals of the multiple individuals that are financial peers of the given individual, i.e., that have financial profiles similar to a given financial profile for the given individual using the specific financial profile elements making up the given financial profile for the given individual. In one embodiment, the financial data associated with the identified one or more financial peers of the given individual is then analyzed, aggregated, averaged, and/or otherwise processed, to provide the given individual budget analysis data and/or one or more budget recommendations.

Figure 2:
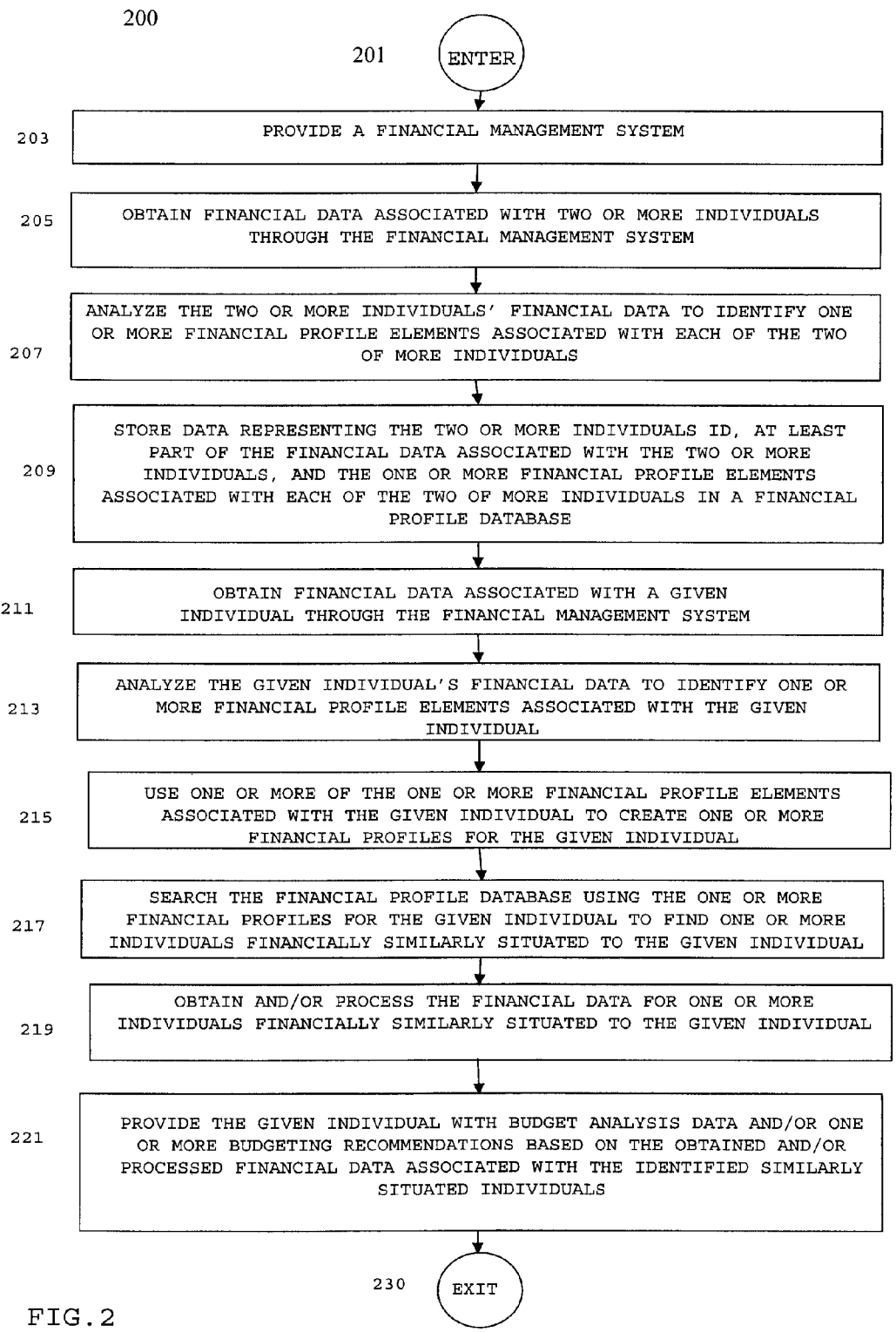
FIG. 2 is a flow chart depicting a process for providing intelligent targeted budget analysis and recommendations based on financial data from similarly situated individuals in accordance with one embodiment.

FIG. 2 a flow chart depicting a process for providing intelligent targeted budget analysis and recommendations based on financial data from similarly situated individuals 200 in accordance with one embodiment. Process for providing intelligent targeted budget analysis and recommendations based on financial data from similarly situated individuals 200 begins at ENTER OPERATION 201 of FIG. 2 and process flow proceeds to PROVIDE A FINANCIAL MANAGEMENT SYSTEM OPERATION 203.

In one embodiment, at PROVIDE A FINANCIAL MANAGEMENT SYSTEM OPERATION 203 a financial management system is provided that includes a capability to obtain and/or access historical financial transaction data associated with a user.

In one embodiment, the financial management system is a computing system implemented financial management system, such as financial management systems 180, 190 and/or 185 of FIG. 1A, and/or an on-line financial management system such as financial management system 126 of FIG. 1A.

Herein, the term financial management system includes, but is not limited to, any computing system implemented, on-line or web-based, system, package, program, module, or application that gathers financial data, has the capability to analyze and categorize at least part of the financial data into various reports or displays that are provided to the user, and provides the user with the capability to conduct, and/or monitor, financial transactions and includes a budgeting feature.

Types of financial management systems include, but are not limited to any of the following: an on-line, or web-based, or computing system implemented personal financial management system, package, program, module, or application; an on-line, or web-based, or computing system implemented personal/home business inventory system, package, program, module, or application; an on-line, or web-based, or computing system implemented personal asset management system, package, program, module, or application; an on-line, or web-based, or computing system implemented business accounting system, package, program, module, or application; an on-line, or web-based, or computing system implemented business financial management system, package, program, module, or application; an on-line, or web-based, or computing system implemented business inventory system, package, program, module, or application; an on-line, or web-based, or computing system implemented business asset management system, package, program, module, or application; an on-line, or web-based, or computing system implemented personal accounting system, package, program, module, or application; an on-line, or web-based, or computing system implemented healthcare expense tracking system, package, program, module, or application; or any on-line, or web-based, data management system as discussed herein, and/or as known in the art at the time of filing, and/or as developed after the time of filing.

Specific examples of financial management systems currently available include, but are not limited to: Quicken Finance Works™ available from Intuit Inc. of Mountain View, Calif.; Mint.com™, available from Intuit Inc. of Mountain View, Calif.; Quicken™, available from Intuit Inc. of Mountain View, Calif.; Quicken Online™, available from Intuit Inc. of Mountain View, Calif.; Quickbooks™, available from Intuit Inc. of Mountain View, Calif.; Quickbooks Online™, available from Intuit Inc. of Mountain View, Calif.; Quicken Healthcare Expense Tracker™ available from Intuit Inc. of Mountain View, Calif.; Microsoft Money™, available from Microsoft, Inc. of Redmond, Wash.; or various other financial management systems discussed herein, or known to those of skill in the art at the time of filing, or as developed after the time of filing.

Returning to FIG. 2, current financial management systems are typically software applications which, along with a parent computing system or device, help individuals/users manage their finances by providing a centralized interface with banks, credit card companies, asset account providers, mortgage companies, retirement account providers and other various financial and asset management institutions and/or accounts, for identifying, processing, storing, and categorizing user financial transactions. Currently, financial management systems typically obtain financial transaction information, such as payee identification, payee location, payment amount, date of the transaction, time of transaction, etc., via communication with banks, credit card providers, or other financial institutions, using data entry, links to databases, and electronic data transfer systems such as the Open Financial Exchange (OFX) specification or various systems for transferring financial transaction data.

Using financial management systems, the financial transaction information, payee identification, payee location, payment amount, date of the transaction, various tags and/or labels, and other data is often used by the financial management system to categorize and/or tag individual financial transactions as a particular type of income or expense, to generate various financial reports, and to create an overview of the individual's financial situation based on input from multiple, and often all, available sources of financial information regarding a given individual. Some currently offered financial management systems then use this financial transaction information to track events, such as purchase events, and to provide various historical personal and business data reports or displays including "to date" data reports, such as historical spending data reports in one or more particular categories and/or tagging schemes, as well as year-end personal and business tax, and/or asset, and/or general financial reports.

In one embodiment, once a financial management system is provided that includes a capability to obtain and/or access historical financial transaction data associated with a user at PROVIDE A FINANCIAL MANAGEMENT SYSTEM OPERATION 203, process flow proceeds to OBTAIN FINANCIAL DATA ASSOCIATED WITH TWO OR MORE INDIVIDUALS THROUGH THE FINANCIAL MANAGEMENT SYSTEM OPERATION 205.

In one embodiment, at OBTAIN FINANCIAL DATA ASSOCIATED WITH TWO OR MORE INDIVIDUALS THROUGH THE FINANCIAL MANAGEMENT SYSTEM OPERATION 205 actual financial data associated with two or more individuals is obtained from one or more sources through the financial management system of PROVIDE A FINANCIAL MANAGEMENT SYSTEM OPERATION 203.

In one embodiment, at OBTAIN FINANCIAL DATA ASSOCIATED WITH TWO OR MORE INDIVIDUALS THROUGH THE FINANCIAL MANAGEMENT SYSTEM OPERATION 205 actual financial data, including data representing historical financial transactions, associated with two or more individuals is obtained from one or more sources through the financial management system of PROVIDE A FINANCIAL MANAGEMENT SYSTEM OPERATION 203.

In one embodiment, at OBTAIN FINANCIAL DATA ASSOCIATED WITH TWO OR MORE INDIVIDUALS THROUGH THE FINANCIAL MANAGEMENT SYSTEM OPERATION 205 actual financial data associated with two or more individuals, including the given individual discussed below, is obtained from one or more sources through the financial management system of PROVIDE A FINANCIAL MANAGEMENT SYSTEM OPERATION 203.

In one embodiment, at OBTAIN FINANCIAL DATA ASSOCIATED WITH TWO OR MORE INDIVIDUALS THROUGH THE FINANCIAL MANAGEMENT SYSTEM OPERATION 205 the historical financial transaction data associated with the two or more individuals is obtained through the financial management system for a defined time frame.

In various embodiments, the defined time frame can be any historical time frame desired such as, but not limited to: previous days, weeks, months, years, etc.

In various embodiments, the defined time frame is determined based, at least in part, on a pay period for an individual.

In one embodiment, at OBTAIN FINANCIAL DATA ASSOCIATED WITH TWO OR MORE INDIVIDUALS THROUGH THE FINANCIAL MANAGEMENT SYSTEM OPERATION 205, in addition to the historical financial transaction data associated with the two or more individuals, other financial data associated with the two or more individuals is obtained from one or more sources through the financial management system of PROVIDE A FINANCIAL MANAGEMENT SYSTEM OPERATION 203 including, but is not limited to: data indicating: the individual's identification; the individual's income, i.e., monthly income, bi-monthly income, weekly income etc; the individual's geographical area or residence or employment; the individual's spending in defined budget categories, e.g. in the top 10 budget categories by amount spent; the individual's budgets and/or budget categories; the individual's spending in one or more budget categories; the individual's age; the individual's marital status; the individual's dependents; the individual's occupation; the individual's household income, from all sources; the individual's average contributions to saving accounts and/or programs over a given time; the individual's savings account balances; the individual's average contributions to retirement accounts and/or programs over a given time; the individual's balances in retirement accounts and/or programs; the individual's average balances in checking; the individual's mortgage/rent payments or other housing costs, such as property tax paid; the individual's equity in real estate; the individual's stocks and other holdings and, in one embodiment, the estimated risk of these holdings; the individual's healthcare expenses; the individual's financial transaction data, including specific spending in defined categories and/or with specific merchants; and/or any other financial and/or demographic data desired/defined by the provider of process for providing intelligent targeted budget analysis and recommendations based on financial data from similarly situated individuals 200 and/or a user of process for providing intelligent targeted budget analysis and recommendations based on financial data from similarly situated individuals 200.

In one embodiment, access to at least part of the historical financial transaction data associated with the two or more individuals, and/or other financial data associated with the two or more individuals, is obtained at OBTAIN FINANCIAL DATA ASSOCIATED WITH TWO OR MORE INDIVIDUALS THROUGH THE FINANCIAL MANAGEMENT SYSTEM OPERATION 205 from the user/given individual, a bank, credit card company, a credit reporting agency or bureau, and/or any other financial institution or data source via any network or network system, such as network 130 of FIG. 1A, and/or the Internet and/or as discussed herein, and/or available or known at the time of filing, and/or as later developed.

Returning to FIG. 2, in one embodiment, access to at least part of the historical financial transaction data associated with the two or more individuals and/or other financial data associated with the two or more individuals is obtained at OBTAIN FINANCIAL DATA ASSOCIATED WITH TWO OR MORE INDIVIDUALS THROUGH THE FINANCIAL MANAGEMENT SYSTEM OPERATION 205 from the user/given individual, a bank, credit card company, a credit reporting agency or bureau, and/or any other financial institution or data source through a user interface device, such as a keyboards 115, 165, or 147 of FIG. 1A, mice 111, 161, or 187, touchpad, voice recognition software, or any other device and/or system capable of providing user input to a computing system and/or for translating user actions into computing system operations, whether available or known at the time of filing or as developed later.

Returning to FIG. 2, in one embodiment, access to at least part of the historical financial transaction data associated with the two or more individuals and/or other financial data associated with the two or more individuals is obtained at OBTAIN FINANCIAL DATA ASSOCIATED WITH TWO OR MORE INDIVIDUALS THROUGH THE FINANCIAL MANAGEMENT SYSTEM OPERATION 205 from a database, such as database 170 of FIG. 1A, maintained by the user/given individual, a bank, a credit card company, credit reporting agency or bureau, and/or any other financial institution or data source, as discussed herein, and/or available or known at the time of filing, and/or as later developed.

Returning to FIG. 2, in one embodiment, access to at least part of the historical financial transaction data associated with the two or more individuals and/or other financial data associated with the two or more individuals is obtained at OBTAIN FINANCIAL DATA ASSOCIATED WITH TWO OR MORE INDIVIDUALS THROUGH THE FINANCIAL MANAGEMENT SYSTEM OPERATION 205 by embedding the data in, or on, a computer program product, as discussed herein, and providing the computer program product to the provider of financial management system associated with process for providing intelligent targeted budget analysis and recommendations based on financial data from similarly situated individuals 200 and/or process for providing intelligent targeted budget analysis and recommendations based on financial data from similarly situated individuals 200.

In one embodiment, access to at least part of the historical financial transaction data associated with the two or more individuals and/or other financial data associated with the two or more individuals is obtained at OBTAIN FINANCIAL DATA ASSOCIATED WITH TWO OR MORE INDIVIDUALS THROUGH THE FINANCIAL MANAGEMENT SYSTEM OPERATION 205 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, stocks, mutual funds, investment accounts, or other financial resources, accounts and/or services used by the tow or more individuals to pay for and/or conduct financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by the two or more individuals to pay for and/or conduct financial transactions.

In one embodiment, access to at least part of the historical financial transaction data associated with the two or more individuals and/or other financial data associated with the two or more individuals is obtained at OBTAIN FINANCIAL DATA ASSOCIATED WITH TWO OR MORE INDIVIDUALS THROUGH THE FINANCIAL MANAGEMENT SYSTEM OPERATION 205 by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, once actual financial data associated with the two or more individuals is obtained from one or more sources through the financial management system of PROVIDE A FINANCIAL MANAGEMENT SYSTEM OPERATION 203 at OBTAIN FINANCIAL DATA ASSOCIATED WITH TWO OR MORE INDIVIDUALS THROUGH THE FINANCIAL MANAGEMENT SYSTEM OPERATION 205, process flow proceeds to ANALYZE THE TWO OR MORE INDIVIDUALS' FINANCIAL DATA TO IDENTIFY ONE OR MORE FINANCIAL PROFILE ELEMENTS ASSOCIATED WITH EACH OF THE TWO OF MORE INDIVIDUALS OPERATION 207.

In one embodiment, at ANALYZE THE TWO OR MORE INDIVIDUALS' FINANCIAL DATA TO IDENTIFY ONE OR MORE FINANCIAL PROFILE ELEMENTS ASSOCIATED WITH EACH OF THE TWO OF MORE INDIVIDUALS OPERATION 207 the historical financial transaction data associated with the two or more individuals, and/or the other financial data associated with the two or more individuals, of OBTAIN FINANCIAL DATA ASSOCIATED WITH TWO OR MORE INDIVIDUALS THROUGH THE FINANCIAL MANAGEMENT SYSTEM OPERATION 205 is analyzed to identify one or more financial profile elements associated with each individual.

In one embodiment, at ANALYZE THE TWO OR MORE INDIVIDUALS' FINANCIAL DATA TO IDENTIFY ONE OR MORE FINANCIAL PROFILE ELEMENTS ASSOCIATED WITH EACH OF THE TWO OF MORE INDIVIDUALS OPERATION 207 the historical financial transaction data associated with the two or more individuals, and/or the other financial data associated with the two or more individuals, of OBTAIN FINANCIAL DATA ASSOCIATED WITH TWO OR MORE INDIVIDUALS THROUGH THE FINANCIAL MANAGEMENT SYSTEM OPERATION 205 is analyzed to identify one or more financial profile elements associated with each individual using one or more processors associated with one or more computing systems, such as CPUs 101, 141, 151 and/or processor 121 of FIG. 1A.

Returning to FIG. 2, in one embodiment, at ANALYZE THE TWO OR MORE INDIVIDUALS' FINANCIAL DATA TO IDENTIFY ONE OR MORE FINANCIAL PROFILE ELEMENTS ASSOCIATED WITH EACH OF THE TWO OF MORE INDIVIDUALS OPERATION 207 the historical financial transaction data associated with the two or more individuals, and/or the other financial data associated with the two or more individuals, of OBTAIN FINANCIAL DATA ASSOCIATED WITH TWO OR MORE INDIVIDUALS THROUGH THE FINANCIAL MANAGEMENT SYSTEM OPERATION 205 is analyzed to identify one or more financial profile elements associated with each individual such as, but not limited to: income; geographical area or residence or employment; spending in defined budget categories, e.g. in the top 10 budget categories by amount spent; budgets and/or budget categories; spending in one or more budget categories; age; marital status; number of dependents; occupation; household income, from all sources; average contributions to saving accounts and/or programs over a given time; savings account balances; average contributions to retirement accounts and/or programs over a given time; balances in retirement accounts and/or programs; average balances in checking; mortgage/rent payments or other housing costs, such as property tax paid; equity in real estate; stocks and other holdings and, in one embodiment, the estimated risk of these holdings; healthcare expenses; specific spending in defined categories and/or with specific merchants; and/or any other financial profile elements associated with each individual desired by the provider of the method and system for providing intelligent targeted budget analysis and recommendations based on financial data from similarly situated individuals and/or one or more individuals/users.

In one embodiment, relatively detailed analysis is possible at ANALYZE THE TWO OR MORE INDIVIDUALS' FINANCIAL DATA TO IDENTIFY ONE OR MORE FINANCIAL PROFILE ELEMENTS ASSOCIATED WITH EACH OF THE TWO OF MORE INDIVIDUALS OPERATION 207 because, as discussed above, in embodiments using financial management systems, the financial transaction data, payee identification, payee location, payment amount, date of the transaction, item purchased identification data, tags, flags, and other data is often used/created by the financial management system to categorize and/or tag and/or flag individual financial transactions as a particular type of income or expense. In addition, as discussed above, financial management systems typically have access to data from multiple sources, and often all sources, so that a relatively complete set of financial data can be obtained and compared.

In one embodiment, once the historical financial transaction data associated with the two or more individuals, and/or the other financial data associated with the two or more individuals, of OBTAIN FINANCIAL DATA ASSOCIATED WITH TWO OR MORE INDIVIDUALS THROUGH THE FINANCIAL MANAGEMENT SYSTEM OPERATION 205 is analyzed to identify one or more financial profile elements associated with each individual at ANALYZE THE TWO OR MORE INDIVIDUALS' FINANCIAL DATA TO IDENTIFY ONE OR MORE FINANCIAL PROFILE ELEMENTS ASSOCIATED WITH EACH OF THE TWO OF MORE INDIVIDUALS OPERATION 207, process flow proceeds to STORE DATA REPRESENTING THE TWO OR MORE INDIVIDUALS ID, AT LEAST PART OF THE FINANCIAL DATA ASSOCIATED WITH THE TWO OR MORE INDIVIDUALS, AND THE ONE OR MORE FINANCIAL PROFILE ELEMENTS ASSOCIATED WITH EACH OF THE TWO OF MORE INDIVIDUALS IN A FINANCIAL PROFILE DATABASE OPERATION 209.

In one embodiment, at STORE DATA REPRESENTING THE TWO OR MORE INDIVIDUALS ID, AT LEAST PART OF THE FINANCIAL DATA ASSOCIATED WITH THE TWO OR MORE INDIVIDUALS, AND THE ONE OR MORE FINANCIAL PROFILE ELEMENTS ASSOCIATED WITH EACH OF THE TWO OF MORE INDIVIDUALS IN A FINANCIAL PROFILE DATABASE OPERATION 209, data indicating the financial profile elements associated with the each of the individuals of ANALYZE THE TWO OR MORE INDIVIDUALS' FINANCIAL DATA TO IDENTIFY ONE OR MORE FINANCIAL PROFILE ELEMENTS ASSOCIATED WITH EACH OF THE TWO OF MORE INDIVIDUALS OPERATION 207, and data linking the financial profile elements associated with the each of the individuals is stored.

In one embodiment, at STORE DATA REPRESENTING THE TWO OR MORE INDIVIDUALS ID, AT LEAST PART OF THE FINANCIAL DATA ASSOCIATED WITH THE TWO OR MORE INDIVIDUALS, AND THE ONE OR MORE FINANCIAL PROFILE ELEMENTS ASSOCIATED WITH EACH OF THE TWO OF MORE INDIVIDUALS IN A FINANCIAL PROFILE DATABASE OPERATION 209, data indicating the financial profile elements associated with the each of the individuals of ANALYZE THE TWO OR MORE INDIVIDUALS' FINANCIAL DATA TO IDENTIFY ONE OR MORE FINANCIAL PROFILE ELEMENTS ASSOCIATED WITH EACH OF THE TWO OF MORE INDIVIDUALS OPERATION 207, and data linking the financial profile elements associated with the each of the individuals is stored in a database, such as database 170 of FIG. 1A, that can be, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

Returning to FIG. 2, in one embodiment, once data indicating the financial profile elements associated with the each of the individuals of ANALYZE THE TWO OR MORE INDIVIDUALS' FINANCIAL DATA TO IDENTIFY ONE OR MORE FINANCIAL PROFILE ELEMENTS ASSOCIATED WITH EACH OF THE TWO OF MORE INDIVIDUALS OPERATION 207, and data linking the financial profile elements associated with the each of the individuals, is stored at STORE DATA REPRESENTING THE TWO OR MORE INDIVIDUALS ID, AT LEAST PART OF THE FINANCIAL DATA ASSOCIATED WITH THE TWO OR MORE INDIVIDUALS, AND THE ONE OR MORE FINANCIAL PROFILE ELEMENTS ASSOCIATED WITH EACH OF THE TWO OF MORE INDIVIDUALS IN A FINANCIAL PROFILE DATABASE OPERATION 209, process flow proceeds to OBTAIN FINANCIAL DATA ASSOCIATED WITH A GIVEN INDIVIDUAL THROUGH THE FINANCIAL MANAGEMENT SYSTEM OPERATION 211.

In one embodiment, at OBTAIN FINANCIAL DATA ASSOCIATED WITH A GIVEN INDIVIDUAL THROUGH THE FINANCIAL MANAGEMENT SYSTEM OPERATION 211 the financial data associated with a given individual is also obtained through the financial management system of PROVIDE A FINANCIAL MANAGEMENT SYSTEM OPERATION 203.

As noted above, in one embodiment, the financial data associated with a given individual is obtained at OBTAIN FINANCIAL DATA ASSOCIATED WITH TWO OR MORE INDIVIDUALS THROUGH THE FINANCIAL MANAGEMENT SYSTEM OPERATION 205 along with the financial data associated with one or more other individuals.

In one embodiment, at OBTAIN FINANCIAL DATA ASSOCIATED WITH A GIVEN INDIVIDUAL THROUGH THE FINANCIAL MANAGEMENT SYSTEM OPERATION 211 the historical financial transaction data associated with the given individual is obtained through the financial management system for a defined time frame.

In various embodiments, the defined time frame can be any historical time frame desired such as, but not limited to: previous days, weeks, months, years, etc.

In various embodiments, the defined time frame is determined based, at least in part, on a pay period for the given individual.

In one embodiment, at OBTAIN FINANCIAL DATA ASSOCIATED WITH A GIVEN INDIVIDUAL THROUGH THE FINANCIAL MANAGEMENT SYSTEM OPERATION 211, in addition to the historical financial transaction data associated with the given individual, other financial data associated with the given individual is obtained from one or more sources through the financial management system of PROVIDE A FINANCIAL MANAGEMENT SYSTEM OPERATION 203 including, but is not limited to: data indicating: the given individual's identification; the given individual's income, i.e., monthly income, bi-monthly income, weekly income etc; the given individual's geographical area or residence or employment; the given individual's spending in defined budget categories, e.g. in the top 10 budget categories by amount spent; the given individual's budgets and/or budget categories; the given individual's spending in one or more budget categories; the given individual's age; the given individual's marital status; the given individual's dependents; the given individual's occupation; the given individual's household income, from all sources; the given individual's average contributions to saving accounts and/or programs over a given time; the given individual's savings account balances; the given individual's average contributions to retirement accounts and/or programs over a given time; the given individual's balances in retirement accounts and/or programs; the given individual's average balances in checking; the given individual's mortgage/rent payments or other housing costs, such as property tax paid; the given individual's equity in real estate; the given individual's stocks and other holdings and, in one embodiment, the estimated risk of these holdings; the given individual's healthcare expenses; the given individual's financial transaction data, including specific spending in defined categories and/or with specific merchants; and/or any other financial and/or demographic data desired/defined by the provider of process for providing intelligent targeted budget analysis and recommendations based on financial data from similarly situated individuals 200 and/or a user of process for providing intelligent targeted budget analysis and recommendations based on financial data from similarly situated individuals 200.

In one embodiment, access to at least part of the historical financial transaction data associated with the given individual and/or other financial data associated with the given individual is obtained at OBTAIN FINANCIAL DATA ASSOCIATED WITH A GIVEN INDIVIDUAL THROUGH THE FINANCIAL MANAGEMENT SYSTEM OPERATION 211 by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, as discussed herein, and/or known at the time of filing and/or as thereafter developed.

In one embodiment, once actual financial data associated with the given individual is obtained from one or more sources through the financial management system of PROVIDE A FINANCIAL MANAGEMENT SYSTEM OPERATION 203 at OBTAIN FINANCIAL DATA ASSOCIATED WITH A GIVEN INDIVIDUAL THROUGH THE FINANCIAL MANAGEMENT SYSTEM OPERATION 211 process flow proceeds to ANALYZE THE GIVEN INDIVIDUAL'S FINANCIAL DATA TO IDENTIFY ONE OR MORE FINANCIAL PROFILE ELEMENTS ASSOCIATED WITH THE GIVEN INDIVIDUAL OPERATION 213.

In one embodiment, at ANALYZE THE GIVEN INDIVIDUAL'S FINANCIAL DATA TO IDENTIFY ONE OR MORE FINANCIAL PROFILE ELEMENTS ASSOCIATED WITH THE GIVEN INDIVIDUAL OPERATION 213 the historical financial transaction data associated with the given individual, and/or the other financial data associated with the given individual, of OBTAIN FINANCIAL DATA ASSOCIATED WITH A GIVEN INDIVIDUAL THROUGH THE FINANCIAL MANAGEMENT SYSTEM OPERATION 211 is analyzed to identify one or more financial profile elements associated with the given individual.

In one embodiment, at ANALYZE THE GIVEN INDIVIDUAL'S FINANCIAL DATA TO IDENTIFY ONE OR MORE FINANCIAL PROFILE ELEMENTS ASSOCIATED WITH THE GIVEN INDIVIDUAL OPERATION 213 the historical financial transaction data associated with the given individual, and/or the other financial data associated with the given individual, of OBTAIN FINANCIAL DATA ASSOCIATED WITH A GIVEN INDIVIDUAL THROUGH THE FINANCIAL MANAGEMENT SYSTEM OPERATION 211 is analyzed to identify one or more financial profile elements associated with the given individual using one or more processors associated with one or more computing systems, such as CPUs 101, 141, 151 and/or processor 121 of FIG. 1A.

Returning to FIG. 2, in one embodiment, at ANALYZE THE GIVEN INDIVIDUAL'S FINANCIAL DATA TO IDENTIFY ONE OR MORE FINANCIAL PROFILE ELEMENTS ASSOCIATED WITH THE GIVEN INDIVIDUAL OPERATION 213 the historical financial transaction data associated with the given individual, and/or the other financial data associated with the given individual, of OBTAIN FINANCIAL DATA ASSOCIATED WITH A GIVEN INDIVIDUAL THROUGH THE FINANCIAL MANAGEMENT SYSTEM OPERATION 211 is analyzed to identify one or more financial profile elements associated with the given individual such as, but not limited to: income; geographical area or residence or employment; spending in defined budget categories, e.g. in the top 10 budget categories by amount spent; budgets and/or budget categories; spending in one or more budget categories; age; marital status; number of dependents; occupation; household income, from all sources; average contributions to saving accounts and/or programs over a given time; savings account balances; average contributions to retirement accounts and/or programs over a given time; balances in retirement accounts and/or programs; average balances in checking; mortgage/rent payments or other housing costs, such as property tax paid; equity in real estate; stocks and other holdings and, in one embodiment, the estimated risk of these holdings; healthcare expenses; specific spending in defined categories and/or with specific merchants; and/or any other financial profile elements associated with each individual desired by the provider of process for providing intelligent targeted budget analysis and recommendations based on financial data from similarly situated individuals 200 and/or one or more individuals/users.

In one embodiment, relatively detailed analysis is possible at ANALYZE THE GIVEN INDIVIDUAL'S FINANCIAL DATA TO IDENTIFY ONE OR MORE FINANCIAL PROFILE ELEMENTS ASSOCIATED WITH THE GIVEN INDIVIDUAL OPERATION 213 because, as discussed above, in embodiments using financial management systems, the financial transaction data, payee identification, payee location, payment amount, date of the transaction, item purchased identification data, tags, flags, and other data is often used/created by the financial management system to categorize and/or tag and/or flag individual financial transactions as a particular type of income or expense. In addition, as discussed above, financial management systems typically have access to data from multiple sources, and often all sources, so that a relatively complete set of financial data can be obtained and compared.

In one embodiment, once the historical financial transaction data associated with the given individual, and/or the other financial data associated with the given individual, of OBTAIN FINANCIAL DATA ASSOCIATED WITH A GIVEN INDIVIDUAL THROUGH THE FINANCIAL MANAGEMENT SYSTEM OPERATION 211 is analyzed to identify one or more financial profile elements associated with the given individual at ANALYZE THE GIVEN INDI- VIDUAL'S FINANCIAL DATA TO IDENTIFY ONE OR MORE FINANCIAL PROFILE ELEMENTS ASSOCIATED WITH THE GIVEN INDIVIDUAL OPERATION 213, process flow proceeds to USE ONE OR MORE OF THE ONE OR MORE FINANCIAL PROFILE ELEMENTS ASSOCIATED WITH THE GIVEN INDIVIDUAL TO CREATE ONE OR MORE FINANCIAL PROFILES FOR THE GIVEN INDIVIDUAL OPERATION 215.

In one embodiment, at USE ONE OR MORE OF THE ONE OR MORE FINANCIAL PROFILE ELEMENTS ASSOCIATED WITH THE GIVEN INDIVIDUAL TO CREATE ONE OR MORE FINANCIAL PROFILES FOR THE GIVEN INDIVIDUAL OPERATION 215 the financial profile elements associated with the given individual of ANALYZE THE GIVEN INDIVIDUAL'S FINANCIAL DATA TO IDENTIFY ONE OR MORE FINANCIAL PROFILE ELEMENTS ASSOCIATED WITH THE GIVEN INDIVIDUAL OPERATION 213 are grouped into sets or sub-sets of financial profile elements to create one or more financial profiles for the given individual.

In one embodiment, at USE ONE OR MORE OF THE ONE OR MORE FINANCIAL PROFILE ELEMENTS ASSOCIATED WITH THE GIVEN INDIVIDUAL TO CREATE ONE OR MORE FINANCIAL PROFILES FOR THE GIVEN INDIVIDUAL OPERATION 215 the financial profile elements associated with the given individual of ANALYZE THE GIVEN INDIVIDUAL'S FINANCIAL DATA TO IDENTIFY ONE OR MORE FINANCIAL PROFILE ELEMENTS ASSOCIATED WITH THE GIVEN INDIVIDUAL OPERATION 213 are grouped into pairs of financial profile elements to create one or more financial profiles for the given individual.

In one embodiment, at USE ONE OR MORE OF THE ONE OR MORE FINANCIAL PROFILE ELEMENTS ASSOCIATED WITH THE GIVEN INDIVIDUAL TO CREATE ONE OR MORE FINANCIAL PROFILES FOR THE GIVEN INDIVIDUAL OPERATION 215 the financial profile elements associated with the given individual are grouped into sets or sub-sets, in one embodiment pairs, of financial profile elements to create one or more financial profiles for the given individual using input from the given individual.

In one embodiment, at USE ONE OR MORE OF THE ONE OR MORE FINANCIAL PROFILE ELEMENTS ASSOCIATED WITH THE GIVEN INDIVIDUAL TO CREATE ONE OR MORE FINANCIAL PROFILES FOR THE GIVEN INDIVIDUAL OPERATION 215 the financial profile elements associated with the given individual are grouped into sets or sub-sets, in one embodiment pairs, of financial profile elements to create one or more financial profiles for the given individual automatically by process for providing intelligent targeted budget analysis and recommendations based on financial data from similarly situated individuals 200.

In one embodiment, at USE ONE OR MORE OF THE ONE OR MORE FINANCIAL PROFILE ELEMENTS ASSOCIATED WITH THE GIVEN INDIVIDUAL TO CREATE ONE OR MORE FINANCIAL PROFILES FOR THE GIVEN INDIVIDUAL OPERATION 215 the financial profile elements associated with the given individual are grouped into sets or sub-sets, in one embodiment pairs, of financial profile elements to create one or more financial profiles for the given individual semi-automatically by process for providing intelligent targeted budget analysis and recommendations based on financial data from similarly situated individuals 200, pending user approval.

In one embodiment, once the financial profile elements associated with the given individual of ANALYZE THE GIVEN INDIVIDUAL'S FINANCIAL DATA TO IDENTIFY ONE OR MORE FINANCIAL PROFILE ELEMENTS ASSOCIATED WITH THE GIVEN INDIVIDUAL OPERATION 213 are grouped into sets or sub-sets of financial profile elements to create one or more financial profiles for the given individual at USE ONE OR MORE OF THE ONE OR MORE FINANCIAL PROFILE ELEMENTS ASSOCIATED WITH THE GIVEN INDIVIDUAL TO CREATE ONE OR MORE FINANCIAL PROFILES FOR THE GIVEN INDIVIDUAL OPERATION 215, process flows proceeds to SEARCH THE FINANCIAL PROFILE DATABASE USING THE ONE OR MORE FINANCIAL PROFILES FOR THE GIVEN INDIVIDUAL TO FIND ONE OR MORE INDIVIDUALS FINANCIALLY SIMILARLY SITUATED TO THE GIVEN INDIVIDUAL OPERATION 217.

In one embodiment, at SEARCH THE FINANCIAL PROFILE DATABASE USING THE ONE OR MORE FINANCIAL PROFILES FOR THE GIVEN INDIVIDUAL TO FIND ONE OR MORE INDIVIDUALS FINANCIALLY SIMILARLY SITUATED TO THE GIVEN INDIVIDUAL OPERATION 217 one or more of the financial profiles for the given individual of USE ONE OR MORE OF THE ONE OR MORE FINANCIAL PROFILE ELEMENTS ASSOCIATED WITH THE GIVEN INDIVIDUAL TO CREATE ONE OR MORE FINANCIAL PROFILES FOR THE GIVEN INDIVIDUAL OPERATION 215, and/or financial profile elements associated with the given individual of ANALYZE THE GIVEN INDIVIDUAL'S FINANCIAL DATA TO IDENTIFY ONE OR MORE FINANCIAL PROFILE ELEMENTS ASSOCIATED WITH THE GIVEN INDIVIDUAL OPERATION 213, are used to search the financial profile database of STORE DATA REPRESENTING THE TWO OR MORE INDIVIDUALS ID, AT LEAST PART OF THE FINANCIAL DATA ASSOCIATED WITH THE TWO OR MORE INDIVIDUALS, AND THE ONE OR MORE FINANCIAL PROFILE ELEMENTS ASSOCIATED WITH EACH OF THE TWO OF MORE INDIVIDUALS IN A FINANCIAL PROFILE DATABASE OPERATION 209 to find one or more individuals of the other individuals of OBTAIN FINANCIAL DATA ASSOCIATED WITH TWO OR MORE INDIVIDUALS THROUGH THE FINANCIAL MANAGEMENT SYSTEM OPERATION 205 that are financial peers of the given individual.

In one embodiment, at SEARCH THE FINANCIAL PROFILE DATABASE USING THE ONE OR MORE FINANCIAL PROFILES FOR THE GIVEN INDIVIDUAL TO FIND ONE OR MORE INDIVIDUALS FINANCIALLY SIMILARLY SITUATED TO THE GIVEN INDIVIDUAL OPERATION 217 one or more of the financial profiles for the given individual, and/or financial profile elements associated with the given individual, are used to search the financial profile database to find one or more individuals that are financial peers of the given individual, i.e., that have financial profile element values similar to a given financial profile value for the given individual using the specific financial profile elements making up the given financial profile for the given individual.

In one embodiment, at SEARCH THE FINANCIAL PROFILE DATABASE USING THE ONE OR MORE FINANCIAL PROFILES FOR THE GIVEN INDIVIDUAL TO FIND ONE OR MORE INDIVIDUALS FINANCIALLY SIMILARLY SITUATED TO THE GIVEN INDIVIDUAL OPERATION 217 one or more of the financial profiles for the given individual, and/or financial profile elements associated with the given individual, are used to search the financial profile database to find one or more individuals that are financial peers of the given individual under the direction of one or more processors associated with one or more computing systems, such as CPUs 101, 141, 151 and/or processor 121 of FIG. 1A.

Returning to FIG. 2, in one embodiment, once one or more of the financial profiles for the given individual of USE ONE OR MORE OF THE ONE OR MORE FINANCIAL PROFILE ELEMENTS ASSOCIATED WITH THE GIVEN INDIVIDUAL TO CREATE ONE OR MORE FINANCIAL PROFILES FOR THE GIVEN INDIVIDUAL OPERATION 215, and/or financial profile elements associated with the given individual of ANALYZE THE GIVEN INDIVIDUAL'S FINANCIAL DATA TO IDENTIFY ONE OR MORE FINANCIAL PROFILE ELEMENTS ASSOCIATED WITH THE GIVEN INDIVIDUAL OPERATION 213, are used to search the financial profile database of STORE DATA REPRESENTING THE TWO OR MORE INDIVIDUALS ID, AT LEAST PART OF THE FINANCIAL DATA ASSOCIATED WITH THE TWO OR MORE INDIVIDUALS, AND THE ONE OR MORE FINANCIAL PROFILE ELEMENTS ASSOCIATED WITH EACH OF THE TWO OF MORE INDIVIDUALS IN A FINANCIAL PROFILE DATABASE OPERATION 209 to find one or more individuals of the other individuals of OBTAIN FINANCIAL DATA ASSOCIATED WITH TWO OR MORE INDIVIDUALS THROUGH THE FINANCIAL MANAGEMENT SYSTEM OPERATION 205 that are financial peers of the given individual at SEARCH THE FINANCIAL PROFILE DATABASE USING THE ONE OR MORE FINANCIAL PROFILES FOR THE GIVEN INDIVIDUAL TO FIND ONE OR MORE INDIVIDUALS FINANCIALLY SIMILARLY SITUATED TO THE GIVEN INDIVIDUAL OPERATION 217, process flow proceeds to OBTAIN AND/OR PROCESS THE FINANCIAL DATA FOR ONE OR MORE INDIVIDUALS FINANCIALLY SIMILARLY SITUATED TO THE GIVEN INDIVIDUAL OPERATION 219.

In one embodiment, at OBTAIN AND/OR PROCESS THE FINANCIAL DATA FOR ONE OR MORE INDIVIDUALS FINANCIALLY SIMILARLY SITUATED TO THE GIVEN INDIVIDUAL OPERATION 219 the financial profile elements of ANALYZE THE TWO OR MORE INDIVIDUALS' FINANCIAL DATA TO IDENTIFY ONE OR MORE FINANCIAL PROFILE ELEMENTS ASSOCIATED WITH EACH OF THE TWO OF MORE INDIVIDUALS OPERATION 207 and/or at least part of the financial data of OBTAIN FINANCIAL DATA ASSOCIATED WITH TWO OR MORE INDIVIDUALS THROUGH THE FINANCIAL MANAGEMENT SYSTEM OPERATION 205 associated with the identified one or more financial peers of the given individual of SEARCH THE FINANCIAL PROFILE DATABASE USING THE ONE OR MORE FINANCIAL PROFILES FOR THE GIVEN INDIVIDUAL TO FIND ONE OR MORE INDIVIDUALS FINANCIALLY SIMILARLY SITUATED TO THE GIVEN INDIVIDUAL OPERATION 217 is analyzed, aggregated, averaged, and/or otherwise processed.

In one embodiment, at OBTAIN AND/OR PROCESS THE FINANCIAL DATA FOR ONE OR MORE INDIVIDUALS FINANCIALLY SIMILARLY SITUATED TO THE GIVEN INDIVIDUAL OPERATION 219 the financial profile elements of ANALYZE THE TWO OR MORE INDIVIDUALS' FINANCIAL DATA TO IDENTIFY ONE OR MORE FINANCIAL PROFILE ELEMENTS ASSOCIATED WITH EACH OF THE TWO OF MORE INDIVIDUALS OPERATION 207 and/or at least part of the financial data of OBTAIN FINANCIAL DATA ASSOCIATED WITH TWO OR MORE INDIVIDUALS THROUGH THE FINANCIAL MANAGEMENT SYSTEM OPERATION 205 associated with the identified one or more financial peers of the given individual of SEARCH THE FINANCIAL PROFILE DATABASE USING THE ONE OR MORE FINANCIAL PROFILES FOR THE GIVEN INDIVIDUAL TO FIND ONE OR MORE INDIVIDUALS FINANCIALLY SIMILARLY SITUATED TO THE GIVEN INDIVIDUAL OPERATION 217 is analyzed, aggregated, averaged, and/or otherwise processed one or more processors associated with one or more computing systems, such as CPUs 101, 141, 151 and/or processor 121 of FIG. 1A.

Returning to FIG. 2, in one embodiment, once the financial profile elements of ANALYZE THE TWO OR MORE INDIVIDUALS' FINANCIAL DATA TO IDENTIFY ONE OR MORE FINANCIAL PROFILE ELEMENTS ASSOCIATED WITH EACH OF THE TWO OF MORE INDIVIDUALS OPERATION 207 and/or at least part of the financial data of OBTAIN FINANCIAL DATA ASSOCIATED WITH TWO OR MORE INDIVIDUALS THROUGH THE FINANCIAL MANAGEMENT SYSTEM OPERATION 205 associated with the identified one or more financial peers of the given individual of SEARCH THE FINANCIAL PROFILE DATABASE USING THE ONE OR MORE FINANCIAL PROFILES FOR THE GIVEN INDIVIDUAL TO FIND ONE OR MORE INDIVIDUALS FINANCIALLY SIMILARLY SITUATED TO THE GIVEN INDIVIDUAL OPERATION 217 is analyzed, aggregated, averaged, and/or otherwise processed at OBTAIN AND/OR PROCESS THE FINANCIAL DATA FOR ONE OR MORE INDIVIDUALS FINANCIALLY SIMILARLY SITUATED TO THE GIVEN INDIVIDUAL OPERATION 219, process flow proceeds to PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221.

In one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the given individual of OBTAIN FINANCIAL DATA ASSOCIATED WITH A GIVEN INDIVIDUAL THROUGH THE FINANCIAL MANAGEMENT SYSTEM OPERATION 211 is provided budgetary analysis and/or one or more budget recommendations based, at least in part, on the analyzed, aggregated, averaged, and/or otherwise processed data of OBTAIN AND/OR PROCESS THE FINANCIAL DATA FOR ONE OR MORE INDIVIDUALS FINANCIALLY SIMILARLY SITUATED TO THE GIVEN INDIVIDUAL OPERATION 219.

In one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the financial data associated with the identified one or more financial peers of the given individual is used to semi-automatically, with user approval, provide the given individual a budget template with initial budgetary guidelines, and/or budgetary categories, and/or budgetary amounts for one or more budget categories, based, at least in part, on the financial data associated with the identified one or more financial peers of the given individual.

In one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the financial data associated with the identified one or more financial peers of the given individual is used to provide the given individual a budget template with initial budgetary guidelines, and/or budgetary categories, and/or budgetary amounts for one or more budget categories, based, at least in part, on the financial data associated with the identified one or more financial peers of the given individual upon user request/activation.

In one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the financial data associated with the identified one or more financial peers of the given individual is used to provide the user/given individual a comparison of the given individual's budget/spending data with the aggregated, averaged, and/or otherwise processed budget/spending data for the identified one or more financial peers of the given individual.

In one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the user/given individual is provided one or more graphical displays and/or data displays showing the recommended budget template and/or a comparison between the aggregated, averaged, and/or otherwise processed budget/spending data for the identified one or more financial peers of the given individual and the financial transaction data, and/or budgeting data, associated with given individual in the form of any symbol or graphical display capable of visually showing the recommended budget template and/or a comparison between the aggregated, averaged, and/or otherwise processed budget/spending data for the identified one or more financial peers of the given individual and the financial transaction data, and/or budgeting data, associated with given individual.

As an example, a thermometer, a sliding scale, any graphical representation, or any partially filled figure or symbol, or outline thereof, may be used. Moreover, these symbols, graphical displays, and scales may, in various embodiments, display one or more of: the aggregated, averaged, and/or otherwise processed budget/spending data for the identified one or more financial peers of the given individual; the financial transaction data, and/or budgeting data, associated with given individual; and/or differential between the aggregated, averaged, and/or otherwise processed budget/spending data for the identified one or more financial peers of the given individual and the financial transaction data, and/or budgeting data, associated with given individual.

In one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the user/given individual is provided data representing the recommended budget template and/or a comparison between the aggregated, averaged, and/or otherwise processed budget/spending data for the identified one or more financial peers of the given individual and the financial transaction data, and/or budgeting data, associated with given individual in the form of a summary report.

In one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the user/given individual is provided data representing the recommended budget template and/or a comparison between the aggregated, averaged, and/or otherwise processed budget/spending data for the identified one or more financial peers of the given individual and the financial transaction data, and/or budgeting data, associated with given individual in the form of one or more tables of data.

In one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the user/given individual is provided data representing the recommended budget template and/or a comparison between the aggregated, averaged, and/or otherwise processed budget/spending data for the identified one or more financial peers of the given individual and the financial transaction data, and/or budgeting data, associated with given individual as a display displayed on any display device accessible by the individual, such as display device 115, 165, 189 and/or 125 of FIG. 1A and/or any display device discussed herein, and/or known in the art at the time of filing, and/or as developed after the time of filing. In one embodiment, the display device is associated with any computing system, such as computing systems 100, 140, 150 and/or server system 120 of FIG. 1A, and/or as discussed herein, and/or known in the art at the time of filing, and/or as developed after the time of filing.

Returning to FIG. 2, in one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the user/given individual is provided data representing the recommended budget template and/or a comparison between the aggregated, averaged, and/or otherwise processed budget/spending data for the identified one or more financial peers of the given individual and the financial transaction data, and/or budgeting data, associated with given individual by providing the individual, or any authorized user, access to one or more websites.

In one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the user/given individual is provided data representing the recommended budget template and/or a comparison between the aggregated, averaged, and/or otherwise processed budget/spending data for the identified one or more financial peers of the given individual and the financial transaction data, and/or budgeting data, associated with given individual by giving the individual, or any authorized user, access to any database, such as database 170 of FIG. 1A, computing system, such as computing systems 100, 140 and/or 150 of FIG. 1A, and/or a server system, such as server system 120 of FIG. 1A, or any web-site or other web-based system, associated with process for providing intelligent targeted budget analysis and recommendations based on financial data from similarly situated individuals 200.

Returning to FIG. 2, In one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the user/given individual is provided data representing the recommended budget template and/or a comparison between the aggregated, averaged, and/or otherwise processed budget/spending data for the identified one or more financial peers of the given individual and the financial transaction data, and/or budgeting data, associated with given individual using a computer program product as discussed herein.

In one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the user/given individual is provided data representing the recommended budget template and/or a comparison between the aggregated, averaged, and/or otherwise processed budget/spending data for the identified one or more financial peers of the given individual and the financial transaction data, and/or budgeting data, associated with given individual through, and/or from, a financial management system, such as financial management systems 180, 185, 190, 126 of FIG. 1A, that is a parent system for, implements, and/or is otherwise associated with, process for providing intelligent targeted budget analysis and recommendations based on financial data from similarly situated individuals 200.

Returning to FIG. 2, in one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the given individual is provided data representing the recommended budget template and/or a comparison between the aggregated, averaged, and/or otherwise processed budget/spending data for the identified one or more financial peers of the given individual and the financial transaction data, and/or budgeting data, associated with given individual through, and/or from, a computing system implemented data management system that is a parent system for, implements, and/or is otherwise associated with, process for providing intelligent targeted budget analysis and recommendations based on financial data from similarly situated individuals 200.

In one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the user/the given individual is provided data representing the recommended budget template and/or a comparison between the aggregated, averaged, and/or otherwise processed budget/spending data for the identified one or more financial peers of the given individual and the financial transaction data, and/or budgeting data, associated with given individual through any network, such as network 130 of FIG. 1A, of computing systems, such as computing systems 100, 140 and 150 of FIG. 1A, and/or server systems, such as server system 120 of FIG. 1A, that is comprised of multiple different computers, wireless devices, cellular telephones, digital telephones, two-way pagers, personal digital assistants, server computers, or any desired combination of these devices, that are interconnected using a network as discussed herein, and/or known in the art at the time of filing, and/or as developed after the time of filing.

Returning to FIG. 2, In one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the user/the given individual is provided data representing the recommended budget template and/or a comparison between the aggregated, averaged, and/or otherwise processed budget/spending data for the identified one or more financial peers of the given individual and the financial transaction data, and/or budgeting data, associated with given individual through e-mail or through text messaging.

In one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the given individual/user is provided data representing the recommended budget template and/or a comparison between the aggregated, averaged, and/or otherwise processed budget/spending data for the identified one or more financial peers of the given individual and the financial transaction data, and/or budgeting data, associated with given individual using any method, apparatus, process, or mechanism for obtaining data, and/or for transferring data, images, screen displays, and/or text from one or more devices, computing systems, server systems, databases, web site/web functions and/or any systems to one or more other devices, computing systems, server systems, databases, web site/web functions and/or any systems, whether known at the time of filing or as thereafter developed.

In one embodiment, at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 the given individual is also provided access to data representing advice regarding any recommended changes and/or allocation of funds the individual might wish to make in order to better align the individual's own financial position/budget with the average financial position/budget of the identified similarly situated individuals.

As a specific illustrative example of one embodiment, process for providing intelligent targeted budget analysis and recommendations based on financial data from similarly situated individuals 200 includes three major components: a budget data capturing component, such as, in one embodiment, would be stored in budget data capturing component module 136 of FIG. 1B; an individual profiling component, such as, in one embodiment, would be stored in individual profiling component module 137 of FIG. 1B; and a budget recommendation/analysis component, such as, in one embodiment, would be stored in budget recommendation/analysis component module 138 of FIG. 1B.

As a specific illustrative example of one embodiment, it is stipulated that at OBTAIN FINANCIAL DATA ASSOCIATED WITH TWO OR MORE INDIVIDUALS THROUGH THE FINANCIAL MANAGEMENT SYSTEM OPERATION 205 and/or OBTAIN FINANCIAL DATA ASSOCIATED WITH A GIVEN INDIVIDUAL THROUGH THE FINANCIAL MANAGEMENT SYSTEM OPERATION 211 (FIG. 2) a given individual and at least one other individual use a financial management system, such as a personal financial management system. In this specific example, once an individual creates an account/presence through the financial management system, the budget data capturing component obtains and stores the following data: the individual's identification (for storing personalized budget preferences); the individual's monthly income (weekly, bi-monthly etc, as applicable); the individual's geographical area; the individual's mortgage or rent amount; amount held in investment accounts associated with the individual, along with estimated investment risk; the individual's spending in defined categories, for instance in the top 10 spending categories; and expense/bill information associated with the individual, i.e., amount and budget category.

In this specific illustrative example of one embodiment, this financial data is obtained/sent at OBTAIN FINANCIAL DATA ASSOCIATED WITH TWO OR MORE INDIVIDUALS THROUGH THE FINANCIAL MANAGEMENT SYSTEM OPERATION 205 and/or OBTAIN FINANCIAL DATA ASSOCIATED WITH A GIVEN INDIVIDUAL THROUGH THE FINANCIAL MANAGEMENT SYSTEM OPERATION 211 (FIG. 2) automatically when an individual creates an account/presence through the financial management system and/or if any of the above data changes, i.e., the individual earns more, changes location etc.

In this specific illustrative example of one embodiment, at the budget data capturing component, when the individual takes an action affecting their budget, i.e., changes the existing budget, creates new budget, etc., the budgeted category affected and the budgeted amount affected is captured and/or updated.

In this specific illustrative example of one embodiment, at the budget data capturing component, the financial data for the given individual and the at least one other individual is used to create three data tables.

In this specific illustrative example of one embodiment, the first table is a "given individual financial data table", which holds the given individual financial data disused above correlated to the given individual. For example, an entry in the given individual financial data table for a given individual with ID 100 may show a mortgage payment of 1500.00 associated with the given individual and a zip code of 90210 associated with the given individual.

In this specific illustrative example of one embodiment, the second table is a "given individual's budget table". In this specific illustrative example of one embodiment, the given individual's budget table includes given individual-specific budget info such as category and amount. For example the given individual's budget table may indicate the given individual with ID 100 has three budget categories and amounts: groceries $500, entertainment $200 and dining out $240.

In this specific illustrative example of one embodiment, the third table is an "other individuals' contribution table". In this specific illustrative example of one embodiment, the other individuals' contribution table includes the given individual's information, in one embodiment as a given individual's profile as supplied by individual profiling component discussed below, as well as the number of other individuals with a similar financial profile that are contributing data. As an example, the data in the other individuals' contribution table may indicate "13 other individual's with incomes similar to the given individual's income and in the given individual's general area of residence, i.e., zip code, have set up category groceries with average $450". Another row/entry might indicate "14 other individual's with mortgage payment similar to the given individual's mortgage payment and in the given individual's general area of residence, i.e., zip code, have set up groceries category with average $621".

As discussed below, in this specific illustrative example of one embodiment, the data from the other individuals' contribution table is then used by the budget recommendation/analysis component at ANALYZE THE TWO OR MORE INDIVIDUALS' FINANCIAL DATA TO IDENTIFY ONE OR MORE FINANCIAL PROFILE ELEMENTS ASSOCIATED WITH EACH OF THE TWO OF MORE INDIVIDUALS OPERATION 207.

In this specific illustrative example of one embodiment, the individual profiling component is provided the set of financial data for the given individual and at least one other individual and then the data is processed and transformed into financial profiles at ANALYZE THE TWO OR MORE INDIVIDUALS' FINANCIAL DATA TO IDENTIFY ONE OR MORE FINANCIAL PROFILE ELEMENTS ASSOCIATED WITH EACH OF THE TWO OF MORE INDIVIDUALS OPERATION 207 and ANALYZE THE GIVEN INDIVIDUAL'S FINANCIAL DATA TO IDENTIFY ONE OR MORE FINANCIAL PROFILE ELEMENTS ASSOCIATED WITH THE GIVEN INDIVIDUAL OPERATION 213. In this specific illustrative example of one embodiment, a financial profile is a pair of financial profile elements and/or financial profile element values selected from the financial data for the given individual and at least one other individual. For example, one financial profile might be the (area, mortgage) pair.

In this specific illustrative example of one embodiment, a complete financial profile is a set of one or more above mentioned financial profile pairs. As an example, a complete financial profile might include variations of input data paired with area such as, but not limited to: (area, income), (area, mortgage) etc. Additionally, more combinations can be added to create a more complete financial profile set such as, but not limited to (income, mortgage), etc.

For instance, a complete user profile may be, for example, (zip 90210, $2000 income), (zip 90210, $1400 spending on food), etc.

In this specific illustrative example of one embodiment, USE ONE OR MORE OF THE ONE OR MORE FINANCIAL PROFILE ELEMENTS ASSOCIATED WITH THE GIVEN INDIVIDUAL TO CREATE ONE OR MORE FINANCIAL PROFILES FOR THE GIVEN INDIVIDUAL OPERATION 215 the individual profiling component uses the aforementioned given individual financial data table of the budget data capturing component to determine a complete financial profile for a given individual in a form of a financial profile vector. This financial profile vector's primary purpose is to serve as key in the other individuals' contribution table of the budget data capturing component.

In this specific illustrative example of one embodiment, at SEARCH THE FINANCIAL PROFILE DATABASE USING THE ONE OR MORE FINANCIAL PROFILES FOR THE GIVEN INDIVIDUAL TO FIND ONE OR MORE INDIVIDUALS FINANCIALLY SIMILARLY SITUATED TO THE GIVEN INDIVIDUAL OPERATION 217 the budget recommendation/analysis component obtains the identification data associated with the given individual and the given individual's financial profile data and uses the given individual's financial profile to iterate through financial profile element pairs, and for every financial profile element pair, a search is performed in the other individuals' contribution table to find financial profile elements pairs of similarly situated other individuals.

In various instances, the search may be based on permissiveness parameters. As an example, for income the permissiveness parameter can be +−5% of this given individual's income or geographically within 50 miles of the given individual's residence.

When a defined number of financial profile elements pairs of similarly situated other individuals have been matched at OBTAIN AND/OR PROCESS THE FINANCIAL DATA FOR ONE OR MORE INDIVIDUALS FINANCIALLY SIMILARLY SITUATED TO THE GIVEN INDIVIDUAL OPERATION 219, the result is budget data for other individuals who are similarly situated or "financial peers" of the given individual. In various instances, several different budgets and/or budget entries are obtained and the budgets and/or budget entries are averaged, weighted, and/or otherwise processed so as to transform the data into an intelligent targeted budget for the given individual at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221.

In this specific illustrative example of one embodiment, a threshold number of matches is required for each financial profile element pair. As an example, a minimum of 10. In some cases, when a financial profile element pair does not have the threshold number of matches that financial profile element pair will not be considered valid, but for all others, the number of matches will be the weighting factor in calculating final budgets.

As an even more specific illustration of one embodiment, let us stipulate that a given individual creates an account, or joins, a financial management system that is associated with process for providing intelligent targeted budget analysis and recommendations based on financial data from similarly situated individuals 200 discussed herein.

Let us further stipulate that the given individual downloads financial data, including financial transaction data from one or more of their associated Financial Institutions (FIs). In one embodiment, the financial data is analyzed and it is determined that the given individual: has a $3000 monthly income; pays $500 rent; has no investments; pays $50 a month for cable; pays $300 a month in electricity bills; lives in San Jose, Calif. and spends identified amounts in 10 budget categories, for instance $450 on home repair.

In one embodiment, the financial management system directs the budget data capturing component to register the given individual, assign the given individual the ID 100, and to store data indicating the financial information above in an account for the given individual.

In one embodiment, when the given individual requests budget analysis and/or recommendations, the financial management system directs the budget recommendation/analysis component to provide an analysis by providing the given individual's ID number 100.

In one embodiment, the budget recommendation/analysis component requests that the individual profiling component to provide financial profile and/or financial profile element data, e.g., financial profile vector data. In this specific example, the financial profile vector data would include the financial profile element pairs: {(San Jose, $3000 income); (San Jose, $500 rent); (San Jose, $50 cable bill); (San Jose, $450 home repair spending in May)}, etc.

In one embodiment, the budget recommendation/analysis component uses this financial profile vector data to perform a look up iteratively in the other individuals' contribution table of the budget data capturing component. In one embodiment, the budget recommendation/analysis component will take (San Jose+−50 miles, $3000+−5% income) and this will yield in say 3 budget categories: (groceries, $400, 13 people), (entertainment, $200, 10 people) and (dining out, $340, 22 people). Iteration on 2nd element of the financial profile vector data may yield (groceries, $420, 15 people), (entertainment, $220, 12 people) and (coffee, $140, 16 people) and so on.

In one embodiment, the budget recommendation/analysis component processes the data and tallies the results in a single budget vector. In one embodiment, if above data were the only values retrieved, the budget recommendation/analysis component would recommend the following budget: (groceries, $411); (entertainment, $211); (dining out, $340); and (coffee, $140).

For clarification, as an example, in this embodiment, a weighted average is used. For example, (groceries, $411) was calculated as follows: ($400*13 people+$420*15 people)/28 contributors=$411.

In one embodiment, if the given individual decides to customize the coffee budget to $160, the change is provided to the budget data capturing component and the financial profile for the given individual is modified to (ID 100, coffee, $160). In one embodiment, the budget data capturing component will add an entry to given individual's own "given individual's budget table" to include this new budget. In addition, in one embodiment, the budget data capturing component will also modify the set of coffee records in the "other individuals' contribution table".

In one embodiment, once the given individual of OBTAIN FINANCIAL DATA ASSOCIATED WITH A GIVEN INDIVIDUAL THROUGH THE FINANCIAL MANAGEMENT SYSTEM OPERATION 211 is provided budgetary analysis and/or one or more budget recommendations based, at least in part on the analyzed, aggregated, averaged, and/or otherwise processed data of OBTAIN AND/OR PROCESS THE FINANCIAL DATA FOR ONE OR MORE INDIVIDUALS FINANCIALLY SIMILARLY SITUATED TO THE GIVEN INDIVIDUAL OPERATION 219 at PROVIDE THE GIVEN INDIVIDUAL WITH BUDGET ANALYSIS DATA AND/OR ONE OR MORE BUDGETING RECOMMENDATIONS BASED ON THE OBTAINED AND/OR PROCESSED FINANCIAL DATA ASSOCIATED WITH THE IDENTIFIED SIMILARLY SITUATED INDIVIDUALS OPERATION 221 process flow proceeds to EXIT OPERATION 230. In one embodiment, at EXIT OPERATION 230, process for providing intelligent targeted budget analysis and recommendations based on financial data from similarly situated individuals 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing intelligent targeted budget analysis and recommendations based on financial data from similarly situated individuals 200, an individual's actual financial transaction data is used to identify financial peers of the individual. Then, using process for providing intelligent targeted budget analysis and recommendations based on financial data from similarly situated individuals 200, the aggregated, averaged, and/or otherwise processed, budget/spending data for the identified financial peers of the given individual is used to provide the individual with an initial budget template and/or guidelines, and/or a comparison between the aggregated, averaged, and/or otherwise processed budget/spending data for the identified one or more financial peers of the given individual and the financial transaction data, and/or budgeting data, associated with given individual.

Consequently, using process for providing intelligent targeted budget analysis and recommendations based on financial data from similarly situated individuals 200, not only are individuals spared the need to expend time and energy entering large amounts of budgeting data required to initiate currently available budgeting features, but they can immediately benefit from the comparative analysis and the "wisdom of the masses" that has become available with the advent of the Internet, improved processing power, and improved data storage.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "monitoring", "updating", "associating", "analyzing", "searching", "defining", "storing", "saving", "displaying", "implementing", "performing", "creating", "assigning", "estimating", "entering", "modifying", "categorizing", "providing", "processing", "accessing", "selecting", "creating", "using", "submitting", "generating", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system for providing intelligent targeted budget analysis and recommendations comprising:
   a storage device; and
   one or more processors configured to:
   obtain a first party's financial data, the first party's financial data including data representing historical financial transactions associated with the first party;
   analyze the first party's financial data and identify one or more financial profile elements associated with the first party, the identification of the one or more financial profile elements associated with the first party being based on the analysis of the first party's financial data;
   create one or more financial profiles for the first party based on one or more of the one or more financial profile elements associated with the first party;
   obtain one or more other parties' financial data, the one or more other parties being parties other than the first party, the one or more other parties' financial data including data representing historical financial transactions associated with respective ones of the one or more other parties;
   analyze the one or more other parties' financial data to identify one or more financial profile elements associated with one or more of the one or more other parties, the identifying being based on the analysis of the one or more other parties' financial data;
   associate data representing the one or more financial profile elements with the respective one or more of the one or more other parties;
   store data representing the one or more financial profile elements associated with the respective one or more of the one or more other parties in the storage device;
   search the stored identified one or more financial profile elements associated with the respective one or more of the one or more other parties to determine at least one financial profile element of at least one of the one or more of the one or more other parties that matches at least one financial profile element of the first party;
   identify, as a result of the determined matched financial profile elements, one or more of the one or more other parties as financial peers of the first party;
   process the financial data associated with the identified one or more financial peers of the first party; and
   provide data representing budget analysis for the first party based, at least in part, on the processed one or more other parties' financial data associated with the identified one or more financial peers of the first party.

2. The computing system for providing intelligent targeted budget analysis and recommendations of claim 1, wherein;
   in addition to the data representing historical financial transactions, the first party's financial data includes financial data selected from the group of financial data consisting of:
   the first party's existing budget categories;
   amounts budgeted in one or more budget categories used by the first party;
   the first party's spending in one or more budget categories;
   the first party's age;
   the first party's area of residence;
   the first party's marital status;
   the first party's dependents;
   the first party's occupation;
   the first party's income;
   the first party's household income;
   the first party's average contributions to saving accounts or programs over a given time;
   the first party's savings account balances;
   the first party's average contributions to retirement accounts or programs over a given time;
   the first party's balances in retirement accounts or programs;
   the first party's average balances in checking;
   the first party's mortgage/rent payments;
   the first party's equity in real estate;
   the first party's stocks and other holdings;
   the first party's healthcare expenses; and
   the first party's spending in defined categories or with specific merchants.

3. The computing system for providing intelligent targeted budget analysis and recommendations of claim 1, wherein;
   at least one of the one or more financial profile elements associated with the first party is selected from the group of financial profile elements consisting of:
   income;
   expenses;
   area of residence;
   home ownership status;
   marital status;
   existence of dependents; and
   number of dependents.

4. The computing system for providing intelligent targeted budget analysis and recommendations of claim 1, wherein;
   one of the one or more financial profile elements associated with the first party includes average contributions to saving accounts or programs over a given time and wherein a second profile element is selected from the group of financial profile elements consisting of:
   age;
   occupation;
   savings account balances;
   average contributions to retirement accounts or programs over a given time;
   balances in retirement accounts or programs;
   average balances in checking;
   mortgage/rent payments;
   equity in real estate;
   stocks and other holdings;
   healthcare expenses; and
   spending in defined categories or with specific merchants.

5. The computing system for providing intelligent targeted budget analysis and recommendations based on financial data of claim 1, wherein;
- the one or more other parties' financial data includes financial data selected from the group of financial data consisting of:
- one or more budget categories used by the one or more other parties;
- amount budgeted in one or more budget categories used by the one or more other parties;
- amounts actually spent in one or more budget categories used by the one or more other parties;
- historical financial transaction data associated with the one or more other parties';
- the other parties' age;
- the other parties' area of residence;
- the other parties' marital status;
- the other parties' dependents;
- the other parties' occupation;
- the other parties' income;
- the other parties' household income;
- the other parties' average contributions to saving accounts or programs over a given time;
- the other parties' savings account balances;
- the other parties' average contributions to retirement accounts or programs over a given time;
- the other parties' balances in retirement accounts or programs;
- the other parties' average balances in checking;
- the other parties' mortgage/rent payments;
- the other parties' equity in real estate;
- the other parties' stocks and other holdings;
- the other parties' healthcare expenses; and
- the other parties' spending in defined categories or with specific merchants.

6. The computing system for providing intelligent targeted budget analysis and recommendations of claim 1, wherein;
- one of the one or more financial profile elements associated with the other parties includes a range of area of residence and a second financial profile element is selected from the group of financial profile elements consisting of:
- a range of income;
- a range of expenses;
- home ownership status;
- marital status;
- existence of dependents; and
- number of dependents.

7. The computing system for providing intelligent targeted budget analysis and recommendations of claim 1, wherein;
- at least one of the one or more financial profile elements associated with the other parties is selected from the group of financial profile elements consisting of:
- an age range;
- occupation;
- a range of average contributions to saving accounts or programs over a given time;
- a range of savings account balances;
- a range of average contributions to retirement accounts or programs over a given time;
- a range of balances in retirement accounts or programs;
- a range of average balances in checking;
- a range of mortgage/rent payments;
- a range of equity in real estate;
- a range of stocks and other holdings;
- a range of healthcare expenses; and
- a range of spending in defined categories or with specific merchants.

8. The computing system for providing intelligent targeted budget analysis and recommendations of claim 1, wherein;
- providing data representing budget analysis for the first party based, at least in part, on the processed financial data associated with the identified one or more financial peers of the first party includes providing data representing one or more budget guidelines for the first party based, at least in part, on the processed one or more other parties' financial data associated with the identified one or more financial peers of the first party.

9. The computing system for providing intelligent targeted budget analysis and recommendations of claim 8 wherein;
- providing data representing one or more budget guidelines for the first party based, at least in part, on the processed financial data associated with the identified one or more financial peers of the first party includes providing data representing a budget template with initial budgetary categories and budgetary amounts for one or more budget categories.

10. The computing system for providing intelligent targeted budget analysis and recommendations of claim 8 wherein;
- providing data representing one or more budget guidelines for the first party based, at least in part, on the processed one or more other parties' financial data associated with the identified one or more financial peers of the first party includes providing data representing a comparison between averaged budget spending data for the identified one or more financial peers of the given party and the financial transaction data associated with the first party.

11. A computing program product for providing intelligent targeted budget analysis and recommendations comprising:
- a nontransitory computer readable medium, the computer readable medium having stored therein instructions which when executed by one or more processors, perform a process comprising:
- obtaining a first party's financial data, the first party's financial data including data representing historical financial transactions associated with the first party;
- analyzing the first party's financial data and identifying one or more financial profile elements associated with the first party, the identification of the one or more financial profile elements associated with the first party being based on the analysis of the first party's financial data;
- creating one or more financial profiles for the first party based on one or more of the one or more financial profile elements associated with the first party;
- obtaining one or more other parties' financial data, the one or more other parties being parties other than the first party, the one or more other parties' financial data including data representing historical financial transactions associated with respective ones of the one or more other parties;
- analyzing the one or more other parties' financial data to identify one or more financial profile elements associated with one or more of the one or more other parties, the identifying being based on the analysis of the one or more other parties' financial data;
- associating data representing the one or more financial profile elements with the respective one or more of the one or more other parties;
- storing data representing the one or more financial profile elements associated with the respective one or more of the one or more other parties in the storage device;

searching the stored identified one or more financial profile elements associated with the respective one or more of the one or more other parties to determine at least one financial profile element of at least one of the one or more of the one or more other parties that matches at least one financial profile element of the first party;

identifying, as a result of the determined matched financial profile elements, one or more of the one or more other parties as financial peers of the first party;

processing the financial data associated with the identified one or more financial peers of the first party; and providing data representing budget analysis for the first party based, at least in part, on the processed one or more other parties' financial data associated with the identified one or more financial peers of the first party.

12. The computing program product for providing intelligent targeted budget analysis and recommendations of claim 11, wherein;

in addition to the data representing historical financial transactions, the first party's financial data includes financial data selected from the group of financial data consisting of:

the first party's existing budget categories;
amounts budgeted in one or more budget categories used by the first party;
the first party's spending in one or more budget categories;
the first party's age;
the first party's area of residence;
the first party's marital status;
the first party's dependents;
the first party's occupation;
the first party's income;
the first party's household income;
the first party's average contributions to saving accounts or programs over a given time;
the first party's savings account balances;
the first party's average contributions to retirement accounts or programs over a given time;
the first party's balances in retirement accounts or programs;
the first party's average balances in checking;
the first party's mortgage/rent payments;
the first party's equity in real estate;
the first party's stocks and other holdings;
the first party's healthcare expenses; and
the first party's spending in defined categories or with specific merchants.

13. The computing program product for providing intelligent targeted budget analysis and recommendations of claim 11, wherein;

one of the one or more financial profile elements associated with the first party includes average contributions to saving accounts or programs over a given time and wherein a second profile element is selected from the group of financial profile elements consisting of:
age;
occupation;
savings account balances;
average contributions to retirement accounts or programs over a given time;
balances in retirement accounts or programs;
average balances in checking;
mortgage/rent payments;
equity in real estate;
stocks and other holdings;
healthcare expenses; and
spending in defined categories or with specific merchants.

14. The computing program product for providing intelligent targeted budget analysis and recommendations based on financial data of claim 11, wherein;

the one or more other parties' financial data includes financial data selected from the group of financial data consisting of:

one or more budget categories used by the one or more other parties;
amount budgeted in one or more budget categories used by the one or more other parties;
amounts actually spent in one or more budget categories used by the one or more other parties;
historical financial transaction data associated with the one or more other parties;
the other parties' age;
the other parties' area of residence;
the other parties' marital status;
the other parties' dependents;
the other parties' occupation;
the other parties' income;
the other parties' household income;
the other parties' average contributions to saving accounts or programs over a given time;
the other parties' savings account balances;
the other parties' average contributions to retirement accounts or programs over a given time;
the other parties' balances in retirement accounts or programs;
the other parties' average balances in checking;
the other parties' mortgage/rent payments;
the other parties' equity in real estate;
the other parties' stocks and other holdings;
the other parties' healthcare expenses; and
the other parties' spending in defined categories or with specific merchants.

15. The computing program product for providing intelligent targeted budget analysis and recommendations of claim 11, wherein;

one of the one or more financial profile elements associated with the other parties includes a range of area of residence and a second financial profile element is selected from the group of financial profile elements consisting of:
a range of income;
a range of expenses;
home ownership status;
marital status;
existence of dependents; and
number of dependents.

16. The computing program product for providing intelligent targeted budget analysis and recommendations of claim 11, wherein;

providing data representing budget analysis for the first party based, at least in part, on the processed financial data associated with the identified one or more financial peers of the first party includes providing data representing one or more budget guidelines for the first party based, at least in part, on the processed one or more other parties' financial data associated with the identified one or more financial peers of the first party.

17. The computing system implemented process for providing intelligent targeted budget analysis and recommendations of claim 16 wherein;

providing data representing one or more budget guidelines for the first party based, at least in part, on the processed one or more other parties' financial data associated with the identified one or more financial peers of the first party includes providing data representing a comparison between averaged budget spending data for the identified one or more financial peers of the given party and the financial transaction data associated with the first party.

* * * * *

UNITED STATES PATENT AND TRADEMARK OFFICE
CERTIFICATE OF CORRECTION

| | | |
|---|---|---|
| PATENT NO. | : 8,296,206 B1 | Page 1 of 1 |
| APPLICATION NO. | : 12/771023 | |
| DATED | : October 23, 2012 | |
| INVENTOR(S) | : James Robert Del Favero et al. | |

It is certified that error appears in the above-identified patent and that said Letters Patent is hereby corrected as shown below:

In the Claims

In Column 47, Line 15, Claim 5, replace "age" with --ages--;
In Column 47, Line 16, Claim 5, replace "area" with --areas--;
In Column 47, Line 19, Claim 5, replace "occupation" with --occupations--;
In Column 47, Line 20, Claim 5, replace "income" with --incomes--;
In Column 47, Line 21, Claim 5, replace "income" with --incomes--;
In Column 50, Line 12, Claim 14, replace "age" with --ages--;
In Column 50, Line 13, Claim 14, replace "area" with --areas--;
In Column 50, Line 16, Claim 14, replace "occupation" with --occupations--;
In Column 50, Line 17, Claim 14, replace "income" with --incomes--;
In Column 50, Line 18, Claim 14, replace "income" with --incomes--; and
In Column 50, Line 58, Claim 17, between "system" and "for", delete "implemented process".

Signed and Sealed this
Seventeenth Day of June, 2014

Michelle K. Lee
*Deputy Director of the United States Patent and Trademark Office*